US012016744B2

(12) United States Patent
Griffin, III et al.

(10) Patent No.: US 12,016,744 B2
(45) Date of Patent: Jun. 25, 2024

(54) CONSTANT DEPTH FRACTURE GROOVE

(71) Applicant: LightForce Orthodontics, Inc., Burlington, MA (US)

(72) Inventors: Alfred Charles Griffin, III, Lynnfield, MA (US); Kelsey A. Fafara, Watertown, MA (US)

(73) Assignee: LightForce Orthodontics, Inc., Burlington, MA (US)

( * ) Notice: Subject to any disclaimer, the term of this patent is extended or adjusted under 35 U.S.C. 154(b) by 0 days.

(21) Appl. No.: 17/840,549

(22) Filed: Jun. 14, 2022

(65) Prior Publication Data

US 2022/0304778 A1  Sep. 29, 2022

Related U.S. Application Data

(63) Continuation of application No. 15/962,261, filed on Apr. 25, 2018, now Pat. No. 11,872,101.

(51) Int. Cl.
*A61C 7/00* (2006.01)
*A61C 7/14* (2006.01)
(Continued)

(52) U.S. Cl.
CPC ............. *A61C 7/002* (2013.01); *A61C 7/146* (2013.01); *A61C 7/148* (2013.01);
(Continued)

(58) Field of Classification Search
CPC ......... A61C 7/148; A61C 7/002; A61C 7/146; A61C 7/20; A61C 13/0022; B33Y 50/02; B33Y 70/00; B33Y 80/00
(Continued)

(56) References Cited

U.S. PATENT DOCUMENTS 4,639,218 A    1/1987  Jones et al.
5,366,372 A *  11/1994 Hansen .................... A61C 7/02
                                                        433/4
(Continued)

FOREIGN PATENT DOCUMENTS

DE   102014107330 A1 *  11/2015  ......... A61C 13/0019
EP       2425798 A2      3/2012
(Continued)

OTHER PUBLICATIONS

Extended European Search Report dated Nov. 3, 2021 in connection with European Application No. 19792830.2.
(Continued)

*Primary Examiner* — Matthew M Nelson
(74) *Attorney, Agent, or Firm* — Wolf, Greenfield & Sacks, P.C.

(57) ABSTRACT

In an embodiment, a method of manufacturing customized ceramic labial/lingual orthodontic brackets by additive manufacturing may comprise measuring dentition data of a profile of teeth of a patient, based on the dentition data, creating a three dimensional computer-assisted design (3D CAD) model of the patient's teeth, and saving the 3D CAD model, designing a virtual 3D CAD bracket structure model for a single labial or lingual bracket structure based upon said 3D CAD model, importing data related to the 3D CAD bracket structure model into an additive manufacturing machine, and directly producing the bracket with the additive manufacturing machine by layer manufacturing from an inorganic material including at least one of a ceramic, a polymer-derived ceramic, and a polymer-derived metal.

21 Claims, 21 Drawing Sheets

(51) Int. Cl.

| | | |
|---|---|---|
| *A61C 13/00* | (2006.01) | |
| *B22F 10/80* | (2021.01) | |
| *B33Y 70/00* | (2020.01) | |
| *A61C 7/20* | (2006.01) | |
| *B22F 10/12* | (2021.01) | |
| *B22F 10/14* | (2021.01) | |
| *B22F 10/28* | (2021.01) | |
| *B33Y 50/02* | (2015.01) | |
| *B33Y 80/00* | (2015.01) | |

(52) U.S. Cl.
  CPC .......... *A61C 13/0022* (2013.01); *B22F 10/80* (2021.01); *B33Y 70/00* (2014.12); *A61C 7/20* (2013.01); *B22F 10/12* (2021.01); *B22F 10/14* (2021.01); *B22F 10/28* (2021.01); *B33Y 50/02* (2014.12); *B33Y 80/00* (2014.12)

(58) Field of Classification Search
  USPC .......................................................... 433/24
  See application file for complete search history.

(56) References Cited

U.S. PATENT DOCUMENTS

| | | | | |
|---|---|---|---|---|
| 5,439,379 | A * | 8/1995 | Hansen | A61C 7/16 433/8 |
| 6,190,165 | B1 * | 2/2001 | Andreiko | A61C 7/16 433/9 |
| 6,830,450 | B2 | 12/2004 | Knopp et al. | |
| 6,846,179 | B2 | 1/2005 | Chapouland et al. | |
| 8,623,264 | B2 | 1/2014 | Rohner et al. | |
| 8,694,142 | B2 | 4/2014 | Yang et al. | |
| 10,241,499 | B1 | 3/2019 | Griffin | |
| 2002/0006597 | A1 | 1/2002 | Andreiko et al. | |
| 2003/0152884 | A1 * | 8/2003 | Wiechmann | A61C 7/002 433/9 |
| 2003/0165790 | A1 | 9/2003 | Castro et al. | |
| 2005/0170308 | A1 * | 8/2005 | Lai | A61C 7/14 433/8 |
| 2005/0214708 | A1 | 9/2005 | Antignano et al. | |
| 2005/0277082 | A1 * | 12/2005 | Christoff | A61C 7/146 433/8 |
| 2006/0008761 | A1 | 1/2006 | Allred | |
| 2006/0127835 | A1 * | 6/2006 | Soo | A61C 7/02 433/4 |
| 2006/0204918 | A1 * | 9/2006 | Voudouris | A61C 7/287 433/14 |
| 2007/0015104 | A1 | 1/2007 | Wiechmann et al. | |
| 2007/0111152 | A1 * | 5/2007 | Primus | A61C 7/16 433/9 |
| 2008/0015727 | A1 | 1/2008 | Dunne et al. | |
| 2008/0085486 | A1 | 4/2008 | Busch | |
| 2008/0153051 | A1 * | 6/2008 | Hart | A61C 7/023 433/4 |
| 2009/0017411 | A1 * | 1/2009 | Pospisil | A61C 7/28 433/10 |
| 2011/0309554 | A1 | 12/2011 | Liska et al. | |
| 2012/0015315 | A1 | 1/2012 | Wiechmann et al. | |
| 2012/0129120 | A1 | 5/2012 | Foerster | |
| 2014/0234527 | A1 | 8/2014 | Huang et al. | |
| 2015/0017596 | A1 | 1/2015 | Wong et al. | |
| 2015/0037747 | A1 | 2/2015 | Choi | |
| 2015/0182307 | A1 * | 7/2015 | Yick | A61C 7/125 433/24 |
| 2015/0223914 | A1 * | 8/2015 | Sabilla | A61C 7/287 433/10 |
| 2016/0038258 | A1 | 2/2016 | Sabilla et al. | |
| 2016/0206404 | A1 | 7/2016 | Rodrigues | |
| 2016/0256240 | A1 | 9/2016 | Shivapuja et al. | |
| 2016/0361142 | A1 | 12/2016 | Tong et al. | |
| 2017/0007368 | A1 | 1/2017 | Boronkay | |
| 2017/0049534 | A1 | 2/2017 | Soo et al. | |
| 2017/0135787 | A1 | 5/2017 | Lopes | |
| 2017/0196666 | A1 * | 7/2017 | Böhm | A61C 13/0019 |
| 2017/0319296 | A1 | 11/2017 | Webber et al. | |
| 2018/0042705 | A1 | 2/2018 | Howe | |
| 2018/0125612 | A1 | 5/2018 | Mashouf, Sr. | |
| 2018/0168776 | A1 | 6/2018 | Webber | |
| 2018/0318046 | A1 * | 11/2018 | Lee | A61C 7/146 |
| 2018/0354860 | A1 | 12/2018 | Wang et al. | |
| 2019/0117340 | A1 | 4/2019 | Oh et al. | |
| 2019/0142551 | A1 | 5/2019 | Dickenson et al. | |
| 2019/0328493 | A1 * | 10/2019 | Griffin, III | A61C 13/0022 |
| 2019/0336247 | A1 | 11/2019 | Raby | |
| 2022/0218443 | A1 | 7/2022 | Griffin, III et al. | |

FOREIGN PATENT DOCUMENTS

| | | | | |
|---|---|---|---|---|
| EP | 2881075 A1 | 6/2015 | | |
| EP | 3170472 A2 | 5/2017 | | |
| FR | 2922753 A1 * | 5/2009 | | A61C 7/14 |
| KR | 100989407 B1 * | 10/2010 | | |
| PL | 208345 B1 * | 4/2011 | | A61C 7/002 |
| WO | WO 01/47405 A2 | 7/2001 | | |
| WO | WO 2006/079459 A1 | 8/2006 | | |
| WO | WO-2007115268 A2 * | 10/2007 | | A61C 7/14 |
| WO | WO-2008119119 A1 * | 10/2008 | | A61C 7/146 |
| WO | WO-2009020282 A1 * | 2/2009 | | A61C 7/146 |
| WO | WO-2015178655 A1 * | 11/2015 | | A61C 7/002 |
| WO | WO 2017/194916 A1 | 11/2017 | | |
| WO | WO-2018005072 A1 * | 1/2018 | | A61C 7/14 |
| WO | WO 2019/241251 A1 | 12/2019 | | |

OTHER PUBLICATIONS

International Search Report and Written Opinion dated Jul. 30, 2019 in connection with International Application No. PCT/US2019/029020.

International Preliminary Report on Patentability dated Nov. 5, 2020 in connection with International Application No. PCT/US2019/029020.

* cited by examiner

CONSTANT DEPTH FRACTURE GROOVE

CROSS-REFERENCE TO RELATED APPLICATION

This application is a continuation of and claims priority under 35 U.S.C. § 120 to U.S. patent application Ser. No. 15/962,261, filed on Apr. 25, 2018, entitled "MANUFACTURE OF PATIENT-SPECIFIC ORTHODONTIC BRACKETS WITH IMPROVED BASE AND RETENTIVE FEATURES," which is incorporated herein by reference in its entirety.

BACKGROUND OF THE INVENTION

1. Field of the Invention

An embodiment of present invention relates generally to the manufacturing of ceramic labial/lingual orthodontic brackets for straightening the teeth and correcting malocclusion. More specifically, an embodiment of the invention relates to the methodology of direct manufacture of customized labial/lingual orthodontic brackets by using a ceramic slurry-based additive manufacturing (AM) technology.

2. Description of the Related Art

Orthodontics has been widely adapted in clinics to correct malocclusion and straighten teeth. The traditional method is to adhere preformed brackets onto the teeth and run elastic metal wires of round, square, or rectangular cross-sectional shape through the bracket slots to provide the driving force. The adaptation of the bracket to the individual tooth is performed by filling the gap between the tooth surface and bracket surface with adhesive. This thereby bonds the bracket to the tooth such that the bracket slot, when the teeth are moved to their final position, lies in a near flat (depending on manufacturing accuracy) horizontal plane.

Preformed edgewise brackets may have no prescription, requiring adjustment of the archwire. Alternatively, the edgewise brackets may have an idealized prescription of angulation, inclination, or in/out variation for specific teeth in what is referred to as a "straight-wire appliance". Because the bracket pad is typically not custom made for an individual patient's tooth, the clinician is responsible for the bracket placement, which may introduce a source of error, which commonly increases patient visits and overall treatment time. These brackets are typically off-the-shelf products, and currently there are no custom designed ceramic brackets available commercially. A misplacement in bonding a bracket to a tooth can be corrected by compensation bends in the wire or by debonding and repositioning of the bracket, both of which increase time and cost. Custom metal lingual brackets are currently available that are fabricated at a central location from 3D scans or impressions of the dentition and mailed back to the clinician and transferred to the patient via indirect bonding. Selective laser melting (SLM) is a 3DAM technique that has been used to create custom metal lingual brackets (for example, see U.S. Pat. No. 8,694,142 B2), but this technique suffers from insufficient resolution and surface finish. While true custom labial brackets have been used, custom positioning of a standard, non-custom bracket can be created via indirect bonding which itself has inherent error within the bracket itself. Many current true custom labial systems (SURESMILE™ Inc.) rely heavily on putting custom bends in the wire based on a 3D scan rather than creating a true straight-wire appliance. For example, U.S. Pat. No. 8,690,568 provides for a method to weld a metal bracket slot to a stock metal bracket base into a custom position, but does not describe a method for creating a custom bracket base or to create an aesthetic, non-metal bracket. These partially custom metal brackets suffer from inaccuracy in slot position and premature debonding due a stock bracket base that doesn't match the tooth morphology, and are unappealing to older patients who prefer to have non-metal brackets for aesthetic concerns.

Ceramic brackets have been commercially available and studied since the 1980s and are a desirable material compared to metal brackets due to their excellent esthetics, resistance to creep, rigidity, biocompatibility, corrosion resistance, stability in the oral environment and non-toxic nature. Ceramic brackets are predominantly manufactured by injection molding, which has manufacturing limitations. For example, it may be difficult or impossible to use injection molding to create undercuts that may enhance a bracket's mechanical bond strength to a tooth adhesive. Currently, no system for creating esthetic custom lingual or labial ceramic orthodontic brackets exists.

A need arises for more efficient and accurate methods for manufacturing patient-specific lingual and labial ceramic orthodontic brackets, and more aesthetic/accurate patient-specific labial brackets.

SUMMARY OF THE INVENTION

An embodiment of the present invention provides improved techniques for creating custom lingual or labial ceramic orthodontic brackets, and which provides the capability for in office fabrication of such brackets.

An embodiment of the present invention may be used to solve problems occurring in the current manufacturing techniques of straight wire appliance orthodontic brackets. For example, in one embodiment, it may provide a direct manufacturing method of customized lingual/labial brackets by utilizing any number of ceramic slurry-based AM technologies, examples of which may include digital light processing (DLP), laser photopolymerization stereolithography, jet printing (including particle jetting, nanoparticle jetting), layer slurry depositioning (LSD), or laser-induced slip casting. A slurry is defined as inorganic particles dispersed in a liquid, and may be photopolymerizable or may polymerize by other mechanisms. Likewise, similar methods may be used to create metal brackets wherein the inorganic materials in the slurry are metal. Examples of items that may be produced include customized labial/lingual brackets according to individual dental and craniofacial features, which may have direct tooth-matching retentive features designed into the bracket base. Ceramic slurry-based AM may be performed in a device small enough to comfortably fit in a private orthodontic lab and can currently be obtained at a reasonable price, given the market price and in-office volume for non-custom and custom brackets.

For example, in one embodiment, a method of manufacturing customized ceramic labial/lingual orthodontic brackets by ceramic slurry-based AM may comprise measuring dentition data of a profile of teeth of a patient, based on the dentition data, creating a three dimensional computer-assisted design (3D CAD) model of the patient's teeth using reverse engineering, and saving the 3D CAD model on a computer, designing a 3D CAD bracket structure model for a single labial or lingual bracket structure, importing data related to the 3D CAD bracket structure model into a ceramic slurry-based AM machine, directly producing the bracket (green part) in the ceramic slurry-based AM machine by layer manufacturing, and processing the brackets in a sintering and debinding oven prior to direct use or other post-processing steps related to surface properties.

The 3D CAD bracket structure model may include data representing at least a) the bracket pad (base) that has recesses and/or undercuts into the bonding surface of the bracket, to contact a particular tooth's surfaces, b) slots for positioning according to the orthodontia needs of the patient, c) a bracket material, d) the particular tooth's profile, and e) a bracket guide to guide 3-dimensional placement of the bracket onto the tooth.

The ceramic slurry-based AM machine may comprise a molding compartment comprising a platform and a plunger to directly produce the bracket by layer manufacturing, a material compartment, and an LED light source for digital light processing, or a print-head with at least one dispensing nozzle as used in "jet" printing, wherein the bracket is produced by layer manufacturing using slicing software to separate the 3D CAD bracket structure model into layers and to get a horizontal section model for each layer so that a shape of each layer produced by the ceramic slurry-based AM machine is consistent with the 3D CAD structure data. The ceramic slurry-based AM machine may comprise a vat adapted to hold the bracket during manufacturing, a horizontal build platform adapted to be held at a settable height above the vat bottom, an exposure unit, adapted to be controlled for position selective exposure of a surface on the horizontal build platform with an intensity pattern with predetermined geometry, a control unit, adapted to receive the 3D CAD bracket structure model and, using the 3D CAD bracket structure model to polymerize in successive exposure steps layers lying one above the other on the build platform, respectively with predetermined geometry, by controlling the exposure unit, and to adjust, after each exposure step for a layer, a relative position of the build platform to the vat bottom, to build up the object successively in the desired form, which results from the sequence of the layer geometries. The exposure unit may further comprise a laser as a light source, a light beam of which successively scans the exposure area by way of a movable mirror controlled by the control unit.

Directly producing the bracket by layer manufacturing may further comprise an apparatus comprising a vat with an at least partially transparently or translucently formed horizontal bottom, into which light polymerizable material can be filled, a horizontal build platform adapted to be held at a settable height above the vat bottom, an exposure unit adapted to be controlled for position and selective exposure of a surface on the build platform with an intensity pattern with predetermined geometry, comprising a light source refined by micromirrors to more precisely control curing, a control unit adapted for polymerizing in successive exposure steps layers lying one above the other on the build platform, controlling the exposure unit so as to selectively expose a photo-reactive slurry in the vat, adjusting, after each exposure for a layer, a relative position of the build platform to the vat bottom, and building up the bracket successively in the desired form, resulting from the sequence of the layer geometries. The exposure unit may further comprise a laser as a light source, a light beam of which successively scans the exposure area by way of a movable mirror controlled by the control unit.

A scanning accuracy may be less than about 0.02 mm. A manufacturing accuracy may be from about 5 to about 60 µm, and wherein the accuracy may be achieved by using a between layer additive error compensation method that predicts an amount of polymerization shrinkage. Manufactured layers of the bracket comprise a material selected from the group consisting of high strength oxides, nitrides and carbides ceramics including but not limited to: Aluminum Oxide ($Al_2O_3$), Zirconium Oxide ($ZrO_2$), Alumina toughened Zirconia (ATZ), Zirconia-toughened alumina (ZTA), Lithium disilicate, Leucite silicate, Nitrides (e.g. SiN4), and mono- or polycrystalline ceramic. The smallest length from a bracket pad to slot depth may be from about 0.2 mm to about 3 mm depending on the bracket offset required and desire to reduce the bracket profile for patient comfort.

The 3D CAD model may be saved as an .stl file or other 3D vector file. The thickness of the manufactured layers may be from about 5 to about 100 micrometers (µm), and the machine may use a X-Y pixel resolution from about 5 to about 100 µm. Different curing strategies (CSs) and depths of cure (Cd) may be used. A selection of material for producing layers of the bracket may be based on different force demands. The printed bracket guides may have a single bracket attachment for a single bracket. An adhesive material may be used to hold the bracket on the ceramic archwire. The adhesive material may be sticky wax. Indirect bonding/custom bracket placement may occur via a tray (for example, a silicone based or vacuum formed tray) that carries the said custom ceramic brackets to the ideal tooth location.

The printed brackets may have a metal insert that contacts the archwire in the slot. The printed brackets may be of a traditional twin design or are modified to be self-ligating or active ligating and are designed to accommodate 0.018 in or 0.022 in archwires in the slot, but slot height may vary from about 0.018 to about 0.022. The bracket angulation, offsets, torque, and prescription may be determined based on a chosen treatment. The structural properties of the base may be altered to facilitate easier debonding of the bracket following treatment. A part of the bracket may be a preformed green ceramic body that functions to decrease the time and complexity of the printed bracket. The method may further comprise producing a bracket guide comprising a rigid ceramic rectangular archwire or other archform that dictates a position of each bracket on a tooth in every plane with at least two occlusal/incisal supports adapted to help place brackets via an indirect bonding system. A part of the bracket that holds or connects the bracket to the tooth surface may be designed based on a surface profile of the tooth. The bracket may have a color that is matched to a color of a tooth to which the bracket is to be attached. The bracket may be clear. The bracket may have a selected color unrelated to a color of a tooth to which the bracket is to be attached.

The ceramic slurry-based AM machine may include a light source that is a laser or LED light source. A light source of the DLP machine may radiate a wavelength between 400 and 500 nm. The DLP machine may include a digital light processing chip as light modulator. The digital light processing chip may be a micromirror array or an LCD array. Alternatively, the ceramic slurry-based AM machine may use a jet technology whereby a liquid ceramic slurry is jetted onto a build-plate in layers, with or without another jet dispensing non-ceramic support material.

Measuring dentition data may be performed using a CT scanner, intra-oral scanner, a coordinate measuring machine, a laser scanner, or a structured light digitizer. Measuring dentition data may be performed by conducting 3D scanning on a casted or 3D printed teeth model.

The light-polymerizable material may be selected from the group consisting of high strength oxides, nitrides and carbides ceramics including but not limited to: Aluminum Oxide (Al$_2$O$_3$), Zirconium Oxide (ZrO$_2$), Alumina toughened Zirconia (ATZ), Zirconia-toughened alumina (ZTA), Lithium disilicate, Leucite silicate, Nitrides (e.g. SiN4), and metals. A slot position relative to the tooth may be customized by manufacturing a custom base or by manufacturing a custom slot position where a base is unchanged.

In an embodiment, a method of manufacturing customized ceramic labial/lingual orthodontic brackets by additive manufacturing may comprise measuring dentition data of a profile of teeth of a patient, based on the dentition data, creating a three-dimensional computer-assisted design (3D CAD) model of the patient's teeth, and saving the 3D CAD model, designing a virtual 3D CAD bracket structure model for a single labial or lingual bracket structure based upon said 3D CAD model, importing data related to the 3D CAD bracket structure model into an additive manufacturing machine, and directly producing the bracket with the additive manufacturing machine by layer manufacturing from an inorganic material including at least one of a ceramic, a polymer-derived ceramic, and a polymer-derived metal.

In embodiments, the additive manufacturing machine may use a slurry based process. The slurry-based process may include at least one of lithography-based manufacturing, inkjet printing, slip casting, laser lithography additive manufacturing, direct light processing, and selective laser melting. The 3D CAD bracket structure model may include data defining at least one slot adapted to receive an archwire, including data defining a compensation angle for walls of the slot to compensate for shrinkage due to over-polymerization and achieve parallel slot walls.

In embodiments, the 3D CAD bracket structure model may include data defining a fracture wall around a perimeter of a base of the bracket. The fracture wall may have a thickness of about 10 to about 150 µm, inclusive. The fracture wall may be adapted so as to fracture upon application of a normal force. The normal force may be applied in at least one of a mesial-distal direction, an occlusal-gingival direction, or to any opposite corners. The fracture wall may be adapted to provide predictable fracture of the wall upon application of the normal force, enabling debonding of the bracket though a combination of tensile and peeling forces. The combination of tensile and peeling forces may be less than a shear bond strength of a bonded bracket. The normal force may be about 10 to about 180 Newtons, inclusive.

In embodiments, the 3D CAD bracket structure model may include data defining a contour of a surface of a base of the bracket. The contour may be adapted to a shape of a tooth to which the bracket is to be bonded. The contour may be further adapted based on at least one of an in/out and offset of the bracket, a tip of the slot, and a torque.

In embodiments, the 3D CAD bracket structure model may include data defining a fracture groove in a base of the bracket. The fracture groove may be in a middle vertical third of the bracket. The fracture groove may include a weakened area including a tooth curved depression in the bracket base in an occlusal-gingival direction. The fracture groove may match a contour of the tooth for that portion of the bracket positioning. The fracture groove may be constant in depth from the tooth surface. The fracture groove may have a depth of about 0.10 mm to about 1.2 mm, inclusive. The fracture groove may vary in depth from the tooth surface. The fracture groove may have a variance in depth of about 1 to about 50%, inclusive, of a distance from the tooth surface to a deepest part of fracture groove. The fracture groove may be in the middle vertical third of the bracket. The fracture groove may have a negative draft angle.

In embodiments, the 3D CAD bracket structure model may include data defining a plurality of retentive structures in a base of the bracket. Each retentive structure may be a three-dimensional figure with a positive draft angle greater than 0°. Each retentive structure may be a three-dimensional figure selected from a group of three-dimensional figures including semi-lunar cones, full-circle cones, squares, rectangles, retentive lattices, and or meshes. Each retentive structure may have a cross-section that is generally trapezoidal, and having a neutral plane oriented toward a tooth structure or surface that is wider than a base plane oriented toward a bracket body. Each neutral plane may be flat. Each neutral plan may be parallel to the base plane. At least some neutral planes may not be parallel to the base plane. At least some neutral planes may not be parallel to the base plane such that an overall pattern of the retentive structures is generally contoured to a shape of a tooth surface to which it is to be bonded. At least some neutral planes may be contoured to a shape of a tooth surface to which it is to be bonded.

In embodiments, the 3D CAD bracket structure model may include data defining at least some corners of the bracket as being rounded. Gingival corners of the bracket may be rounded. The rounded corners of the bracket may have a radius of curvature of about 0.05 to about 2.0 mm. The bracket may be adapted to be bonded to the lingual or labial surfaces of a tooth.

In embodiments, the bracket may be made of an inorganic material with at least one component selected from a group of materials including an oxide ceramic, a nitride ceramic, a carbide ceramic, Aluminum Oxide (Al2O3), Zirconium Oxide (ZrO2), Alumina-toughened Zirconia (ATZ), Zirconia-toughened alumina (ZTA), Lithium disilicate, Leucite silicate and Silicon Nitride. The 3D CAD bracket structure model may include data defining a mesial-distal or horizontal slot adapted to receive an archwire, a vertical slot adapted to receive at least a portion of the archwire within a middle third of the bracket, or both. The vertical slot may be further adapted to accept a digitally designed lingual multiloop wire.

DETAILED DESCRIPTION OF THE INVENTION

An embodiment of the present invention provides improved techniques for creating custom lingual or labial ceramic orthodontic brackets, provides improved brackets, and which may further provide the capability for in-office fabrication of such brackets.

Figure 1:
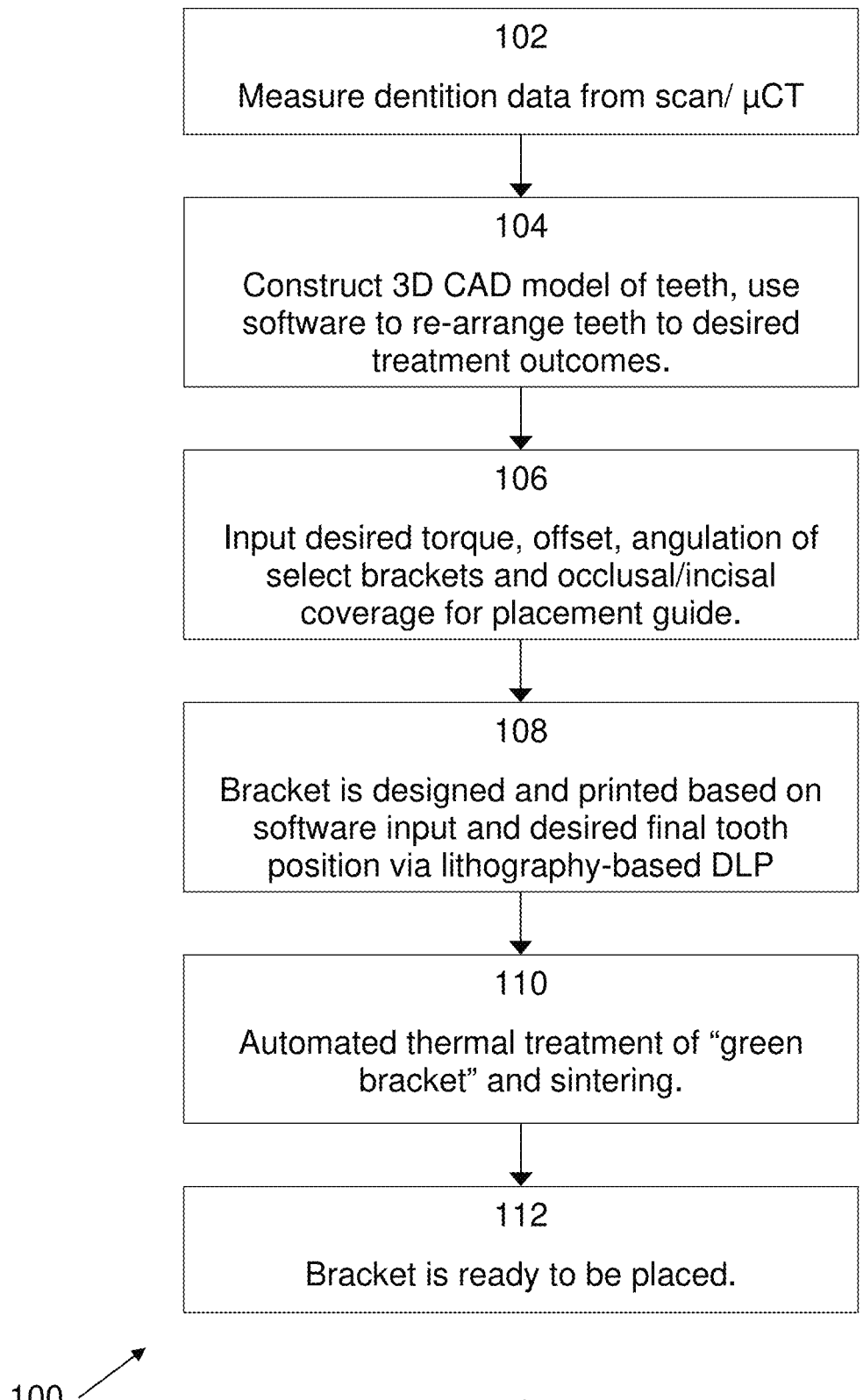
FIG. 1 is an exemplary flow diagram of an embodiment of a process for direct manufacturing lingual or labial orthodontic brackets.

An exemplary flowchart of an embodiment a direct manufacturing process 100 of lingual or labial orthodontic brackets by ceramic slurry-based AM is shown in FIG. 1. The process begins with 102, in which dentition data is measured and the parameters of the tooth profile are analyzed. For example, such measurement may use CT layer scanning a non-contact 3D scanner or an intra-oral scanner directly on the patient's teeth, or may use 3D readings on a teeth model previously cast or 3D printed using a coordinate measuring machine, a laser scanner, or structured light digitizers. The scanning accuracy of such techniques is typically less than about 0.02 mm.

In 104, based on the given dentition data, a 3D CAD model of the measured teeth is constructed based on the dentition data and saved in the computer in a typical file format, such as the .stl, Additive manufacturing File (AMF) format or any other 3D vector file. The exterior structure of teeth is complicated, usually including irregular curves. The software may then be used to re-arrange the teeth in the model to the desired treatment outcomes that may be based on the long-axis of a tooth.

In 106, additional information, such as the desired torque, offset, angulation of select brackets and occlusal/incisal coverage for placement guide is entered.

In 108, the bracket (or brackets) is designed by the software based on the input 3D CAD model of the measured teeth, the model of the desired treatment outcomes, and the input additional information. The output of the design process may be a 3D CAD model. Such a 3D CAD model may be designed for a single lingual/labial bracket structure, including the bracket guide and bracket pad in contact with teeth surface, as well as the slots for the ideal position according to the orthodontia requirement, ceramic bracket material, and tooth profile. A bracket guide may be a single bracket pad for a single bracket or may be a rigid ceramic rectangular archwire with two or more occlusal supports, which are designed to help place brackets via indirect bonding. If the guide is for a single bracket, the bracket guide may be printed such that it is serrated at its interface with the bracket such that it may be snapped or drilled off upon bonding.

Figure 2:
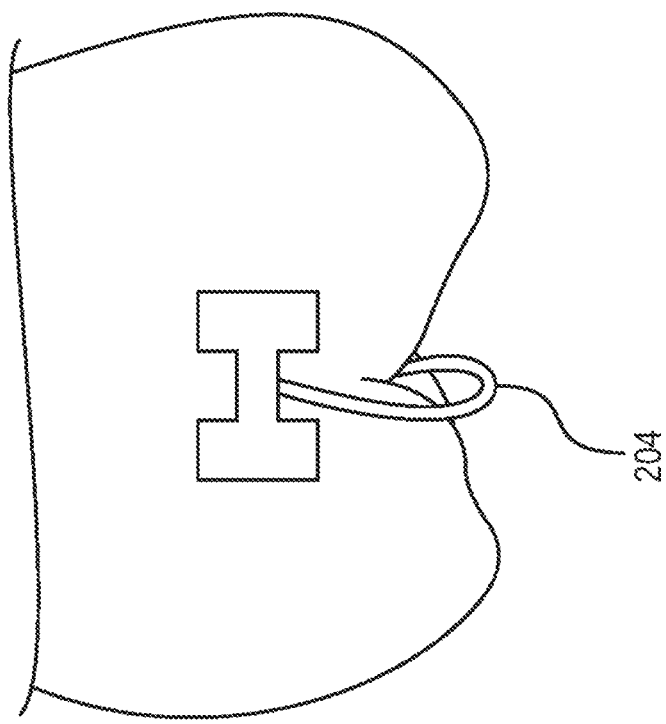
FIG. 2 illustrates an example of a single bracket bracket-guide showing a lower molar and upper incisor tooth.
Figure 2:
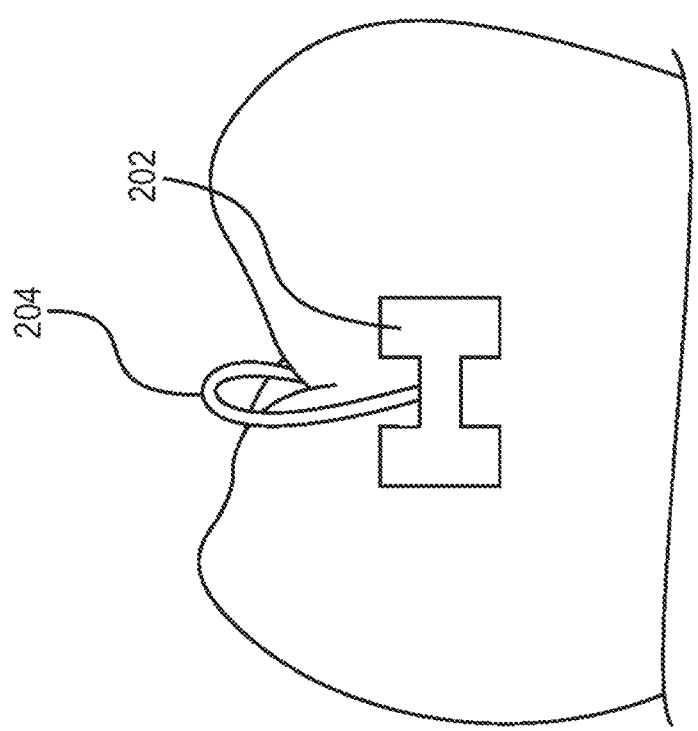
Figure 3:
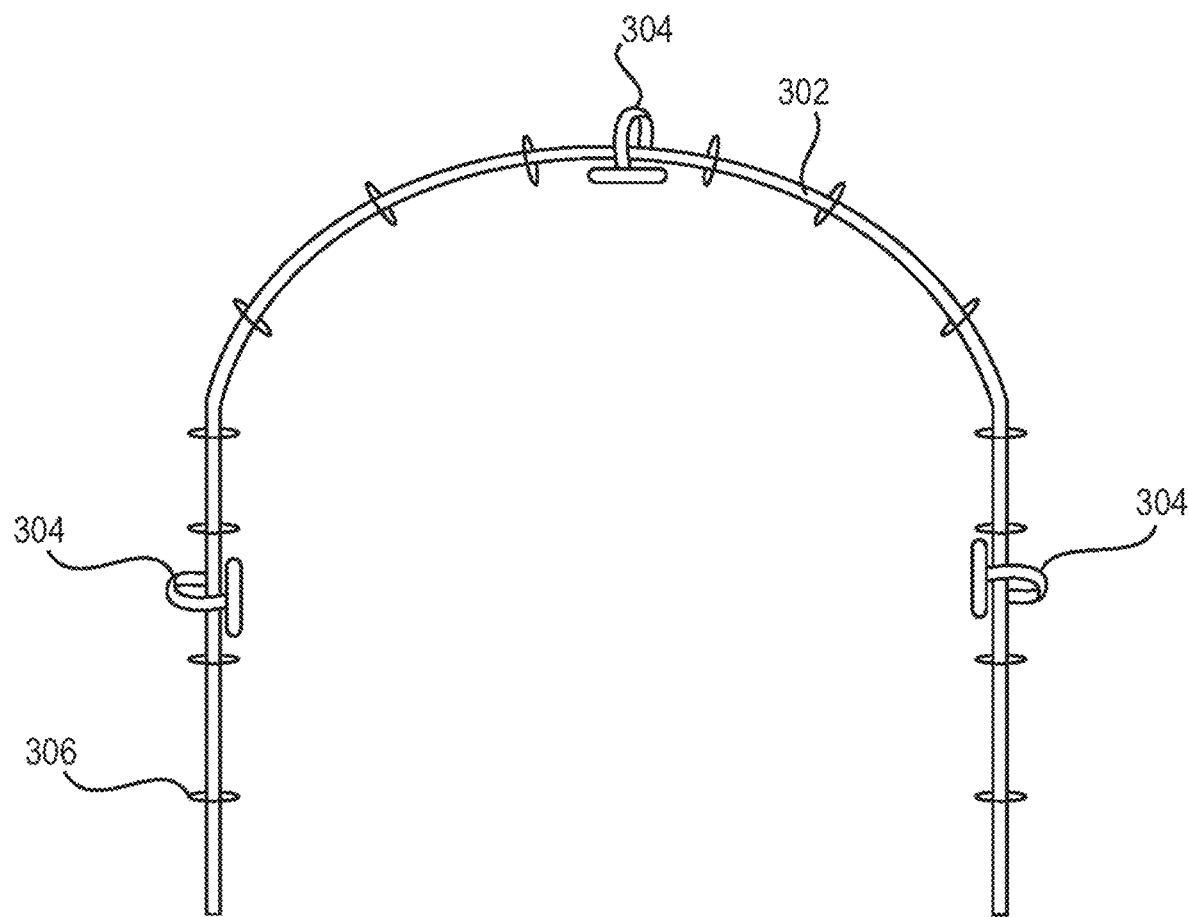
FIG. 3 illustrates an example of a bracket guide that may be a rigid ceramic rectangular archwire that engages each bracket in every plane with two or more occlusal supports.

3D CAD bracket structure models of labial or lingual brackets may be designed by computer according to the orthodontic requirements, material, and teeth morphology. Referring to FIG. 2, which illustrates an example of a single bracket bracket-guide showing a lower molar and upper incisor tooth with a connected, but detachable bracket guide that may have a weak point or serration at the guide-bracket interface. The bracket model design may include the bracket pad 202 (bonding pad) contacting with the tooth surface, as well as the custom bracket slot located on its ideal position and a bracket guide 204. A bracket guide 204 may be a single bracket pad 202 attached to a single bracket guide 204, as shown in FIG. 2. Alternatively, as shown in FIG. 3, a bracket guide may be a rigid ceramic rectangular archwire that engages each bracket in every plane with two or more occlusal supports 304 that are designed to help place brackets via indirect bonding. The horizontal wire and the occlusal/incisal pads control for vertical position. Vertical notches such as 306 on the wire control the horizontal position of the bracket on the ceramic wire.

3D CAD bracket structure models are processed to generate manufacturing control data for use by the production equipment. For example, where the ceramic slurry-based AM equipment is used to produce the brackets, the software slices the 3D CAD bracket structure models to separate it into thin layers and get the horizontal section model for each layer. Based on this section model, the DLP equipment can directly produce ceramic brackets, ensuring the shape of each layer is consistent to the 3D CAD structure data. For example, the thickness of such layers may be about 20 μm to about 50 μm (micrometers or microns) with a manufacturing accuracy of about 5 μm to about 10 μm by using between-layer additive error compensation.

Returning to 108 of FIG. 1, the 3D CAD bracket structure model is transmitted to or imported into a 3D production machine, such as a ceramic slurry-based AM machine and the ceramic brackets are produced DLP is another ceramic additive manufacturing (AM) process that works by stacking layers of a photocurable resin with a ceramic oxide such as Aluminum Oxide ($Al_2O_3$) or Zirconium Oxide ($ZrO_2$), Nitrides or Silicates solid loading, and followed by a thermal debinding and sintering step. The higher resolution of this process is made possible by the LED light's digital mirror device (DMD) chip and optics used. (Stereo-)Lithography-based ceramic manufacturing (LCM) has improved this process making it more accurate with higher resolution (40 μm) and rigidity. The LCM process involves the selective curing of a photosensitive resin containing homogenously dispersed oxide or glass ceramic particles that can be fabricated at very high resolution due to imaging systems which enable the transfer of layer information by means of ever-improving LED technology, though a laser may also be used for photopolymerization.

In 110, post-processing may then be applied. For example, a thermal treatment (for binder burnout) and a sintering process may be applied to achieve optimal or improved ceramic density. For example, the debinding and sintering phase may include removing the green bracket from the device, exposing the blank to a furnace to decompose the polymerized binder (debinding), and sintering of the ceramic material.

The pad (bonding pad) of the bracket may be less than about 0.4 mm thick from the tooth. The bracket placement guide may be placed occlusally/incisally to guide the correct placement of the bracket on the tooth. Examples of raw materials of the brackets may include powder of high strength oxide ceramics such as Aluminum Oxide ($Al_2O_3$) and Zirconium Oxide ($ZrO_2$), or other high strength ceramic compositions.

The base of bracket may be adhered to the tooth surface and the bracket slot may be matched to the archwire. According to requirements of mechanical properties, different composition of material may be required for the layers during the DLP manufacturing process. After being built up, the brackets may have a gradient and better performance.

Further, the bracket surface may be processed based on clinical demand.

Returning to FIG. 1, in 112, the bracket is ready to be placed.

Typically, the thickness of the bracket pad may less than 1 mm for lingual brackets and less than 1.5 for labial brackets. Suitable manufacturing materials may include high strength oxides, nitrides and carbides ceramics including but not limited to: Aluminum Oxide ($Al_2O_3$), Zirconium Oxide ($ZrO_2$), Alumina-toughened Zirconia (ATZ), Zirconia-toughened alumina (ZTA), Lithium disilicate, Leucite silicate or Silicon Nitride. The bracket pad may be adhered to the tooth surface with well-known dental adhesives. The bracket slot may be matched to the archwire, which may be straight or custom bent. Depending upon the manufacturing process used, different ceramics or composition of powder may be required for the layers. For example, if a selective laser melting manufacturing process is used, an LED light source may be used for the selective curing of a photosensitive resin containing the oxide or glass ceramic particles. Different layers may use different ceramics or compositions of powder.

Figure 4:
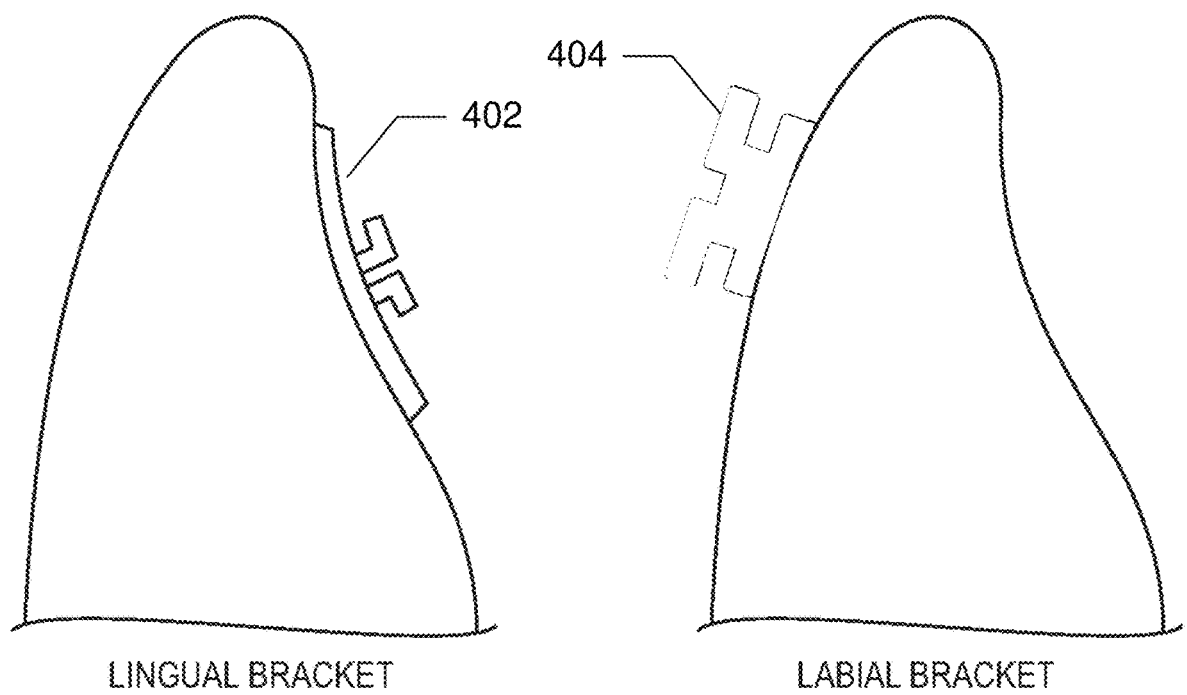
FIG. 4 illustrates an example of designed brackets having a custom bracket pad that is matched to the lingual or labial surface of the tooth.

The bracket pad, which holds or connects the bracket to the tooth surface, may be designed specifically according to the tooth surface profile, instead of a generalized gridding pattern. The customized brackets can meet individual case demand, such as increased anterior labial crown torque required in certain types of cases. For example, as shown in FIG. 4, the curve on tooth surface and the designed bracket, the tooth side of the bracket (bracket pad) is matched to the lingual or labial surface of the tooth, for example for lingual bracket 402 and labial bracket 404.

Figure 5:
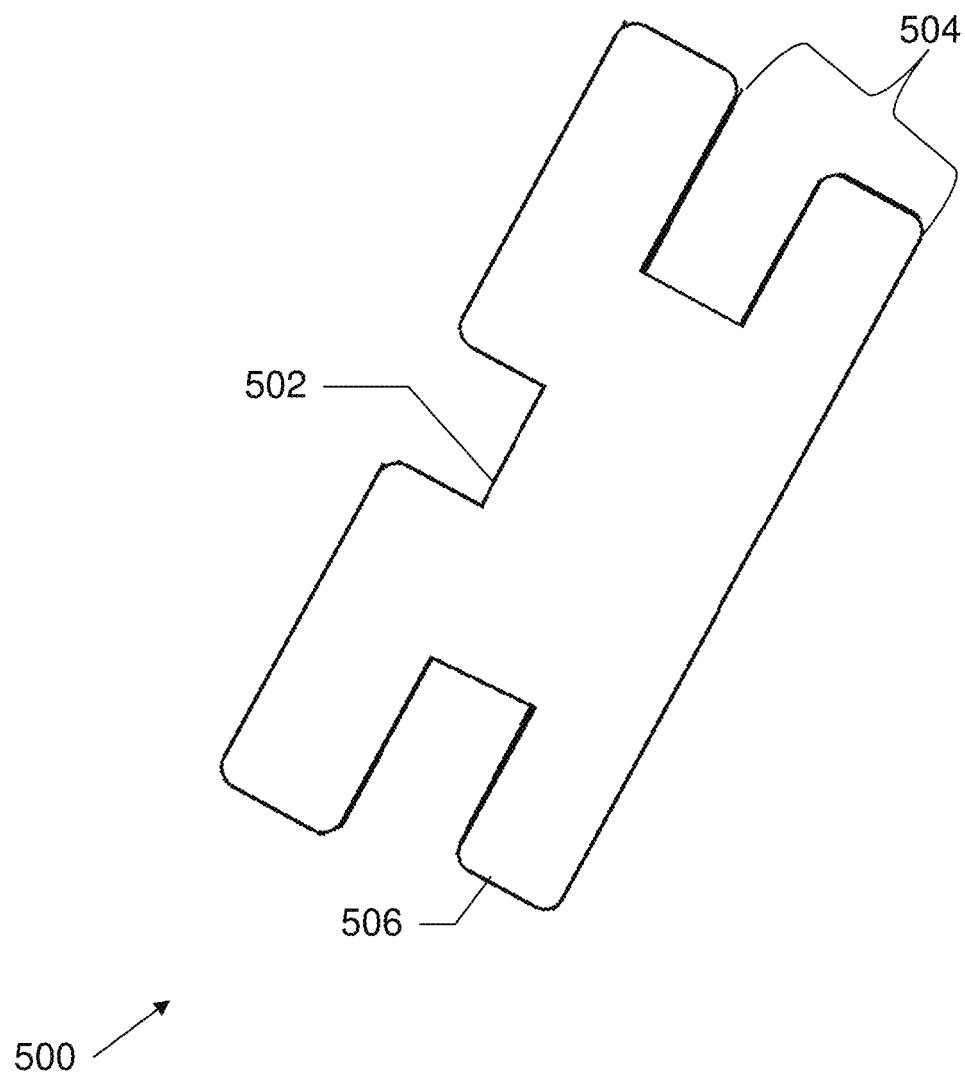
FIG. 5 illustrates a side view of an example of a designed bracket.

A side view of an exemplary printed bracket 500 is shown in FIG. 5. The slot 502 on the bracket may have high accuracy in size, shape, and angler, and may have low thickness and is designed to accommodate a rectangular wire when completely filled. Slot 502 may be manufactured to any desired size and shape, but typically, slot 502 is manufactured with a greater depth than height or width. The base 504 of the bracket may have different height because of the selected material or desired orthodontic result. Likewise, the pad 506 of the bracket may highly match the tooth surface and maximize the tooth contact surface. This may allow for more accurate bracket placement by the clinician and better bond approximation to the tooth. Also, because each slot has its own position and shape to cooperate with the archwire, twisting error may be minimized and improved orthodontic result may be actualized. In a number of embodiments, these features may be manufactured as one piece and that the customization of the slot relative to the tooth may be a function of the slot changing position or the bracket base moving. In many embodiments, no machining of the features is required to produce a suitable bracket.

Figure 6:
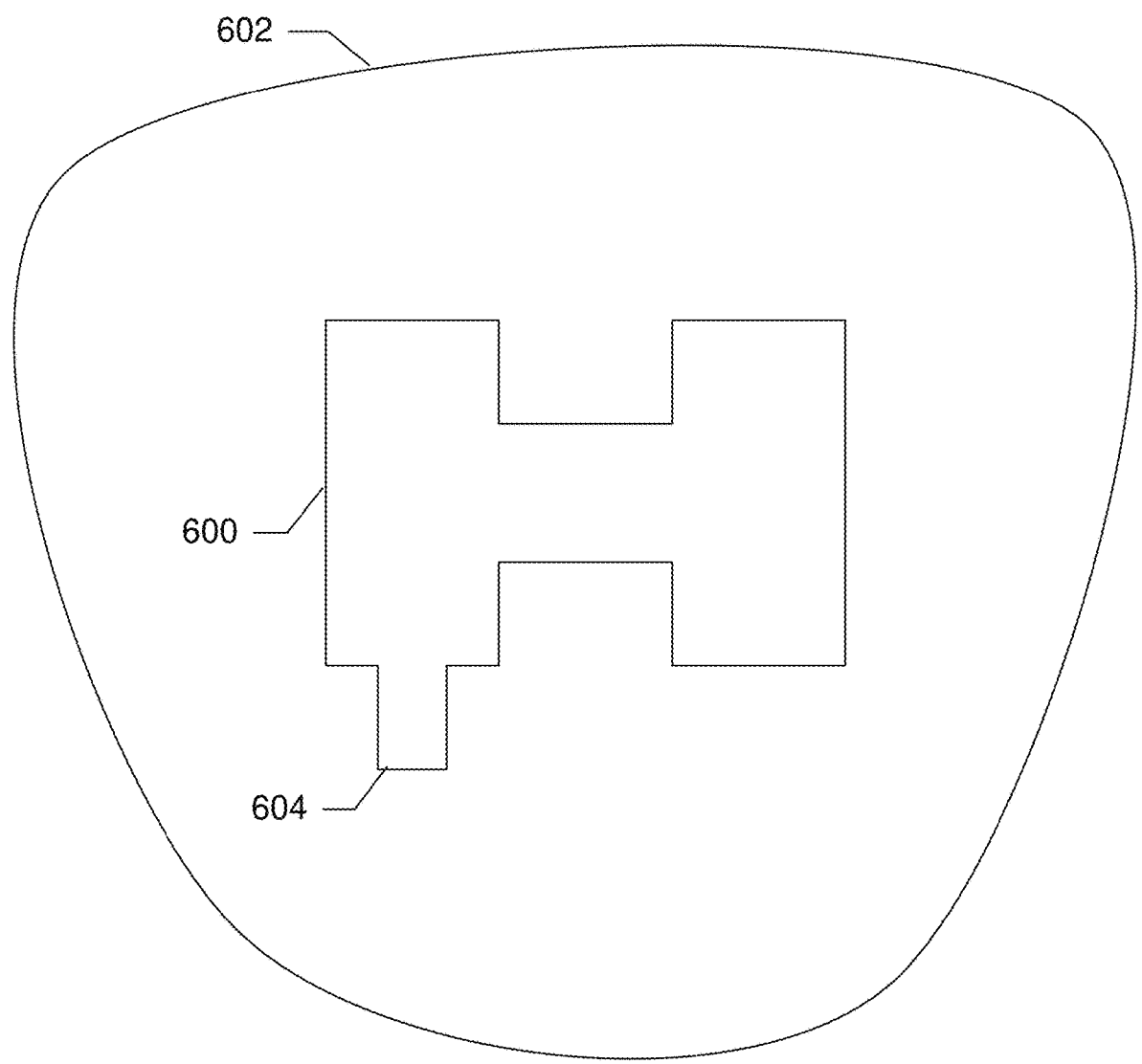
FIG. 6 illustrates a top view of an example of a designed bracket.

A top view of an exemplary printed bracket 600 is shown in FIG. 6. Bracket guides may be printed that extend an arm occlusally/incisally that attaches to a pad that covers enough of the structure of the tooth 602 (mesial/distal of occlusal/incisal surface or marginal ridge) such that brackets are placed in the computer-generated ideal location to create the desired tooth position. A bracket guide may be any number of indirect bonding (IDB) guides, jigs or trays that may be from a plurality of materials that are made by traditional methods or by a CAD/CAM methods which include SLA, DLP or Jet printing. Alternatively, the bracket-positioning device may be a rigid ceramic rectangular archwire that engages each bracket in every plane with two or more occlusal supports that are designed to help place brackets via indirect bonding. The horizontal ceramic wire and the occlusal/incisal pads control for vertical position, vertical notches on the wire control the horizontal position of the bracket on the ceramic wire guide.

Bracket 600 may further include an attachment such as a hook 604 that provides the capability to use additional delivery systems such as elastomers, springs or other attachments that create vectors of force. In a number of embodiments, these features may be manufactured as one piece, protruding from any predesigned area to create the proper force vectors desired, and no machining of the features is required to produce a suitable bracket.

Using the ceramic slurry-based AM technique can turn the designed model into a ceramic product rapidly. The bracket manufacturing involves few steps and can be done on site, saving time and cost.

The described techniques may be used to manufacture brackets from consisting of high strength oxides, nitrides and carbides ceramics including but not limited to: Aluminum Oxide ($Al_2O_3$), Zirconium Oxide ($ZrO_2$), Alumina-toughened Zirconia (ATZ), Zirconia-toughened alumina (ZTA), Lithium disilicate, Leucite silicate or Silicon Nitride.

The described techniques may be used to attain a true straight wire appliance where bracket placement accuracy is improved, thus reducing treatment time and error; or may also be used in conjunction with a custom-bent arch wire to achieve ideal results.

Patients currently pay higher fees for white-colored ceramic brackets over metal due to their increased esthetics. For example, many patients desire a bracket that matches the color of the tooth to which the bracket is attached. This may cause the bracket to be less visible and provide improved appearance. As another example, embodiments of the present invention may provide the capability to produce clear brackets, which may provide still improved appearance. Additionally, embodiments of the present invention may provide the capability to produce brackets in almost any color desired or selected, for example, in bright colors for use in children and some adults. Likewise, embodiments of the present invention may provide the capability to produce brackets having visible shapes that are not dictated by function, such as in the shape of animals, vehicles, toys, etc., for example, for use in children and some adults.

The described techniques may be made cost-effective to the point where an individual orthodontic practice could purchase the required equipment and software. This would provide the capability to simplify their bracket inventory instead of stocking brackets of different prescriptions.

Digital light processing (lithography-based) of ceramics has many advantages for orthodontic bracket fabrication, in comparison to selective laser sintering/melting (SLM) which uses thermal energy, and 3-D printing (3DP) systems that use a binder and polymer-derived ceramics (PDCs). For example, DLP may provide higher surface quality, better object resolution, and improved mechanical properties. PDCs structured using light in a stereolithographic or mask exposure process may also be used as a ceramic AM method for bracket fabrication.

Custom lingual brackets may be fabricated by this method, which may receive a pre-bent customized archwire as described by US 2007/0015104 A1. Custom labial brackets may also receive pre-bent wires.

The procedure for the layering additive manufacturing (AM) methodology of the labial/lingual orthodontic brackets by lithography-based DLP (for example, U.S. Pat. No. 8,623,264 B2) is as follows.

An example of a lithography-based DLP process is described in U.S. Pat. No. 8,623,264 B2, which is incorporated herein by reference, but may be briefly summarized as follows: a light-polymerizable material, the material being located in at least one trough, having a particularly light-transmissive, horizontal bottom, is polymerized by illumination on at least one horizontal platform, the platform having a pre-specified geometry and projecting into a trough, in an illumination field, wherein the platform is displaced vertically to form a subsequent layer, light-polymerizable material is then added to the most recently formed layer, and repetition of the foregoing steps leads to the layered construction of the orthodontic bracket in the desired prescription/mold, which arises from the succession of layer geometries determined from the CAD software. The trough can be shifted horizontally to a supply position, and the supply device brings light-polymerizable material at least to an illumination field of the trough bottom, before the at least one trough is shifted to an illumination position in which the illumination field is located below the platform and above the illumination unit, and illumination is carried out, creating a "green bracket".

The light-polymerizable material or photo-reactive suspension (slurry) can be prepared based on commercially available di- and mono-functional methacrylates. An example material might be a slurry blend of about 0.01 to about 0.025 wt % of a highly reactive photoinitiator, about 0.05 to about 6 wt % a dispersant, an absorber, and about 2 to about 20 wt % of a non-reactive diluent. A solid loading of high strength Oxide ceramics such as Aluminum Oxide ($Al_2O_3$) and Zirconium Oxide ($ZrO_2$) powder can be used, but this process may extend to other ceramic materials.

Figure 7:
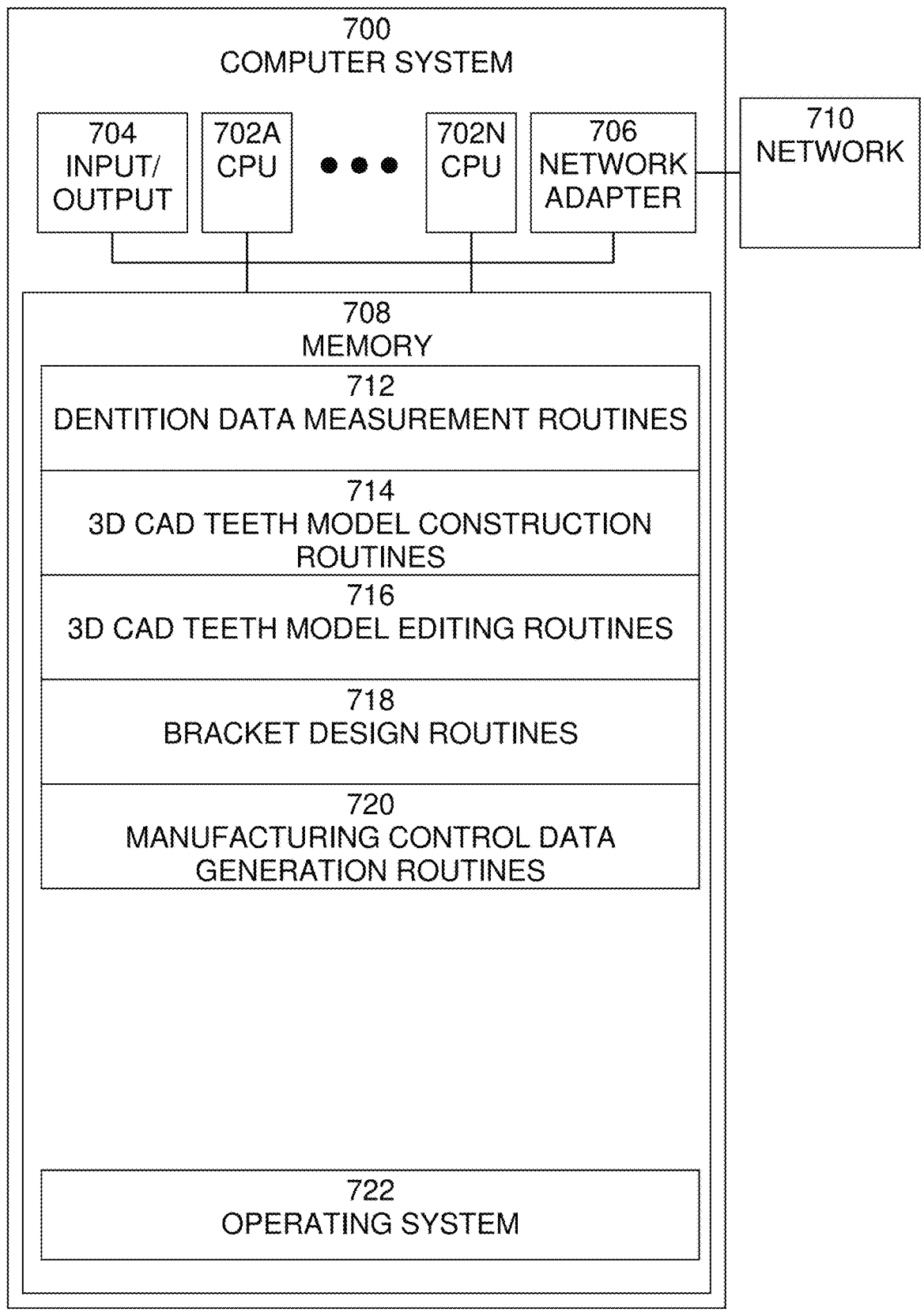
FIG. 7 is an exemplary block diagram of an embodiment of a computer system in which the processes of the present invention may be implemented.

An exemplary block diagram of a computer system 700, in which the processes shown above may be implemented, is shown in FIG. 7. Computer system 700 is typically a programmed general-purpose computer system, such as a personal computer, workstation, server system, and minicomputer or mainframe computer. Computer system 700 includes one or more processors (CPUs) 702A-702N, input/output circuitry 704, network adapter 706, and memory 708. CPUs 702A-702N execute program instructions in order to carry out the functions of embodiments of the present invention. Typically, CPUs 702A-702N are one or more microprocessors, such as an INTEL PENTIUM® processor. FIG. 7 illustrates an embodiment in which computer system 700 is implemented as a single multi-processor computer system, in which multiple processors 702A-702N share system resources, such as memory 708, input/output circuitry 704, and network adapter 706. However, the present invention also contemplates embodiments in which computer system 700 is implemented as a plurality of networked computer systems, which may be single-processor computer systems, multi-processor computer systems, or a mix thereof.

Input/output circuitry 704 provides the capability to input data to, or output data from, computer system 700. For example, input/output circuitry may include input devices, such as keyboards, mice, touchpads, trackballs, scanners, etc., output devices, such as video adapters, monitors, printers, etc., and input/output devices, such as, modems, etc. Network adapter 706 interfaces device 700 with a network 710. Network 710 may be any public or proprietary LAN or WAN, including, but not limited to the Internet.

Memory 708 stores program instructions that are executed by, and data that are used and processed by, CPU 702 to perform the functions of computer system 700. Memory 708 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 708 varies depending upon the function that computer system 700 is programmed to perform. In the example shown in FIG. 7, memory contents that may be included in a system in which a content analysis platform is implemented are shown. However, one of skill in the art would recognize that these functions, along with the memory contents related to those functions, may be included on one system, or may be distributed among a plurality of systems, based on well-known engineering considerations. Embodiments of the present invention contemplate any and all such arrangements.

In the example shown in FIG. 7, memory 708 may include dentition data measurement routines 712, 3D CAD teeth model construction routines 714, 3D CAD teeth model editing routines 716, bracket design routines 718, manufacturing control data generation routines 720, and operating system 722. Dentition data measurement routines 712 may obtain and process dentition data, such as may be generated by CT layer scanning or a non-contact 3D scanner directly on the patient's teeth, or uses 3D readings on the teeth model previously cast. 3D CAD teeth model construction routines 714 may construct a 3D CAD model of the measured teeth based on the dentition data. 3D CAD teeth model editing routines 716 may be used to re-arrange the teeth in the model to the desired treatment outcomes and may additionally be used to accept additional information, such as the desired torque, offset, angulation of select brackets and occlusal/incisal coverage for placement guide. Bracket design routines 718 may be used to design and generate a 3D CAD model based on the input 3D CAD model of the measured teeth, the model of the desired treatment outcomes, and the input additional information. Manufacturing control data generation routines 720 may be used to generate manufacturing control data for use by the production equipment. Operating system 722 provides overall system functionality.

It is to be noted that additional functionality may be implemented in end user devices, such as end user devices 104 shown in FIG. 1. End user systems may be computer systems having a structure similar to that shown in FIG. 7. Such end user systems may include geometric analysis routines to perform geometric analysis of a location of an advertisement or content, such as may be performed by step 302 of FIG. 3. Likewise, such end user systems may include resource-based analysis routines to determine whether a computer is optimizing an advertisement or content for display on the screen, such as may be performed by step 302 of FIG. 3.

As shown in FIG. 7, an embodiment of the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Figure 8:
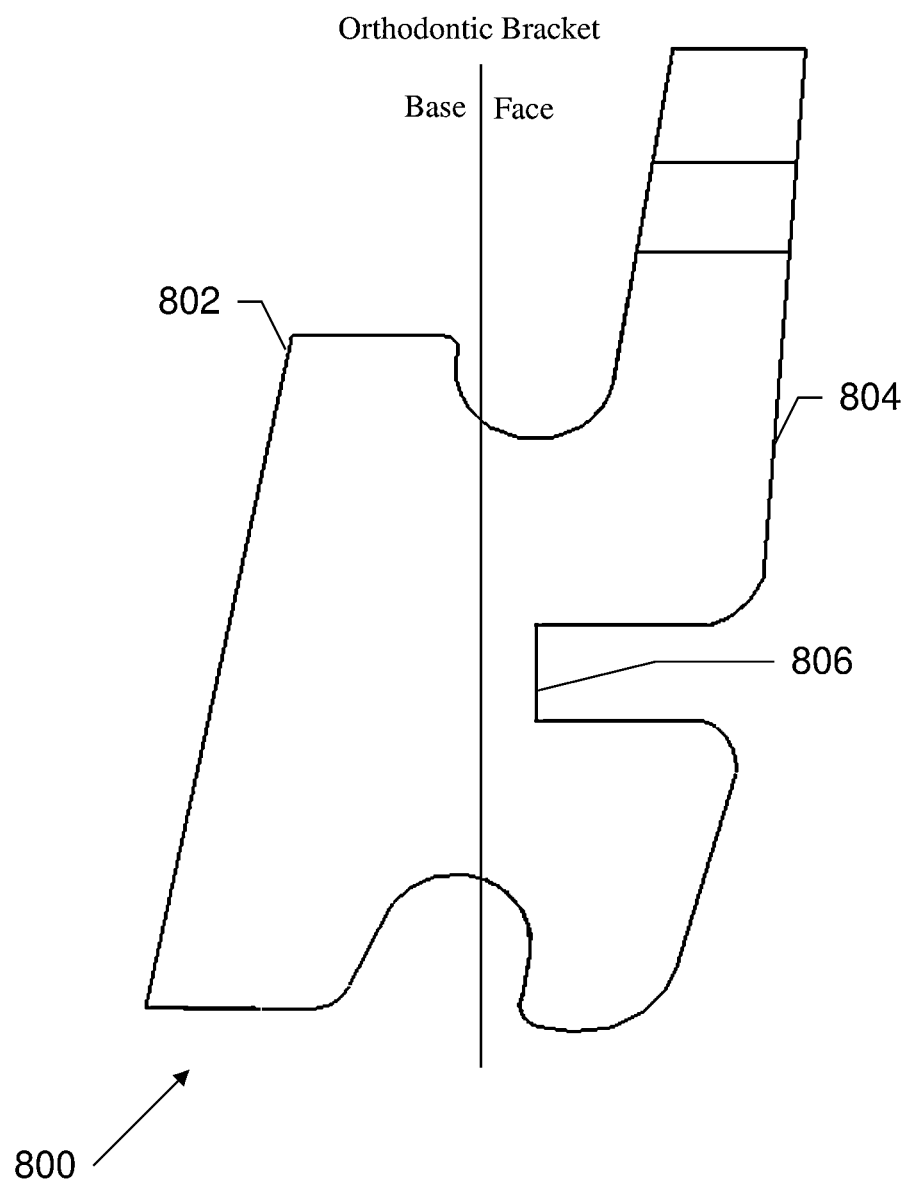
FIG. 8 is an exemplary illustration of an embodiment of an orthodontic bracket.

An example of an orthodontic bracket 800 is shown in FIG. 8. In this example, the base 802 of the bracket is shown to the left and the face 804 of the bracket is shown to the right. Base 802 is the portion that comes into contact with the tooth, and face 804 includes slot 806, which in embodiments may be a mesial-distal slot adapted to receive an archwire for applying force to a tooth.

Figure 9:
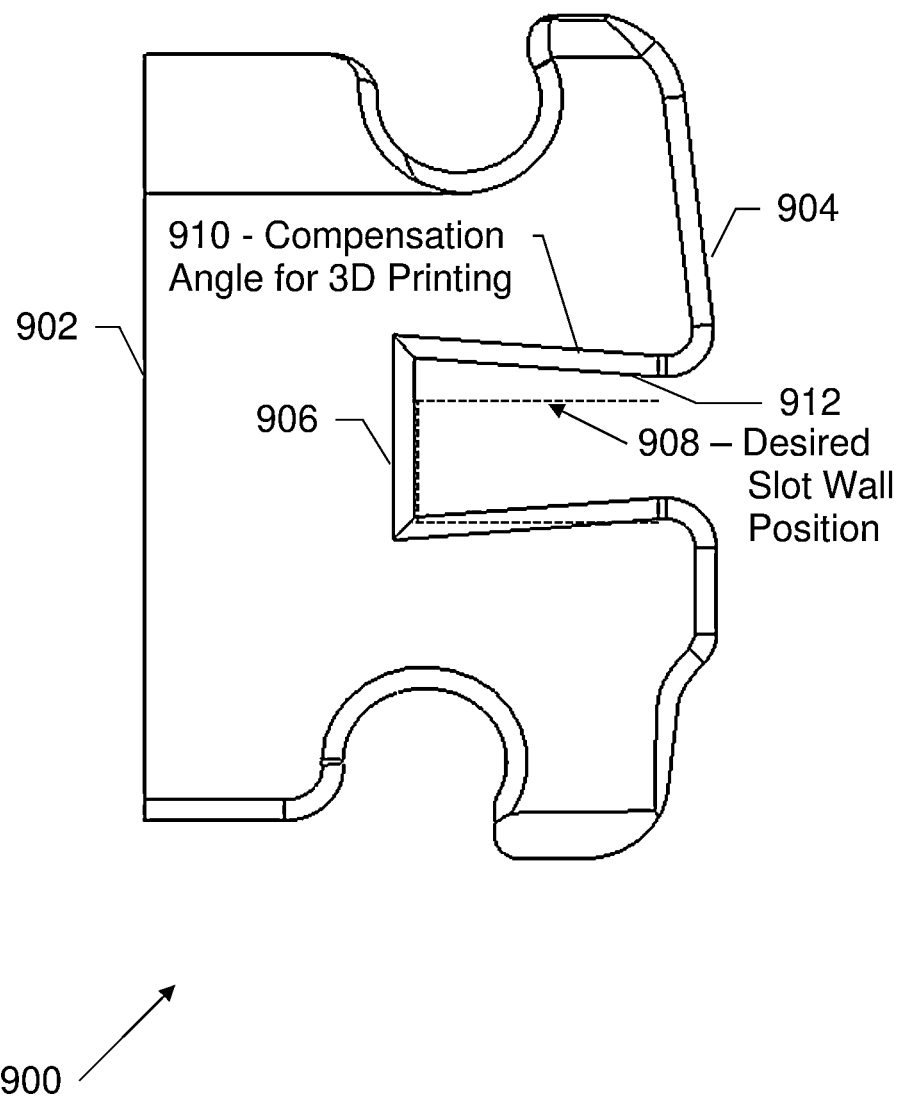
FIG. 9 is an exemplary illustration of an embodiment of an orthodontic bracket.

An example of an orthodontic bracket 900 is shown in FIG. 9. In this example, the base 902, face 904, and slot 906 are shown. Also shown are the desired slot wall position 908 and a compensation angle 910 for the walls 912 of slot 906, which may be utilized to counteract shrinkage due to over-polymerization and achieve parallel slot walls 912 of a desired dimension. In embodiments, slot 906 may be a mesial-distal slot adapted to receive an archwire for applying force to a tooth. Slot 906 may be initially manufactured with a "dovetail" cross-section including compensation angle 910, so that the finished bracket may achieve parallel slot walls of a desired dimension, as shown by desired slot wall position 908.

Figure 10:
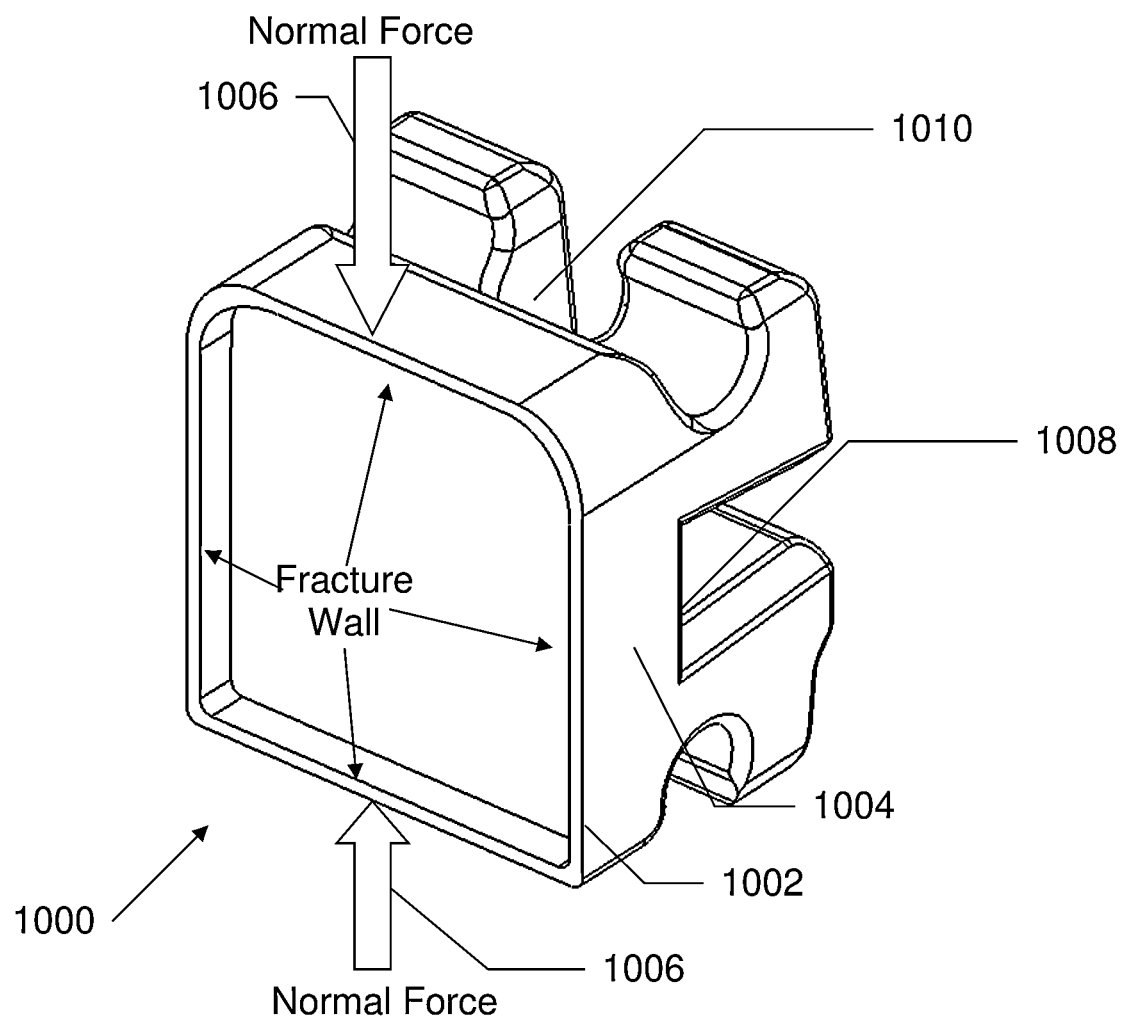
FIG. 10 is an exemplary illustration of an embodiment of an orthodontic bracket.

An example of an orthodontic bracket 1000 is shown in FIG. 10. In this example, a fracture wall 1002 may be manufactured around the perimeter of the base 1004 of bracket 1000. In embodiments, fracture wall 1002 may have a consistent thickness, which may be in a range of 15-140 μm, inclusive. In embodiments, fracture wall 1002 may have a varying thickness, which may be in a range of 15-140 μm, inclusive. In embodiments, bonding cement may be inserted into the cavity formed by fracture wall 1002. In embodiments, the wall thickness may be consistent around all edges of bracket 1000, enabling a normal force 1006 (the component of the contact force that is perpendicular to the surface of fracture wall 1002) to be applied in any direction, such as mesial-distal, occlusal-gingival, or to any opposite corners. The continuity of fracture wall 1002 around the entire bracket may provide predictable fracture of the wall via pliers, enabling debonding of the bracket though a combination of tensile and peeling forces, which is typically less than the shear bond strength of a bonded bracket. For example, pliers may be used that may, moving around the ligated wire, induce a mesial-distal force 1006 on the labial portion of the bracket. In embodiments, such force may be in range of 10-180 Newtons, inclusive. Also shown in this example are slot 1008 (archwire/mesial-distal slot) and auxiliary slot 1010.

Figure 11:
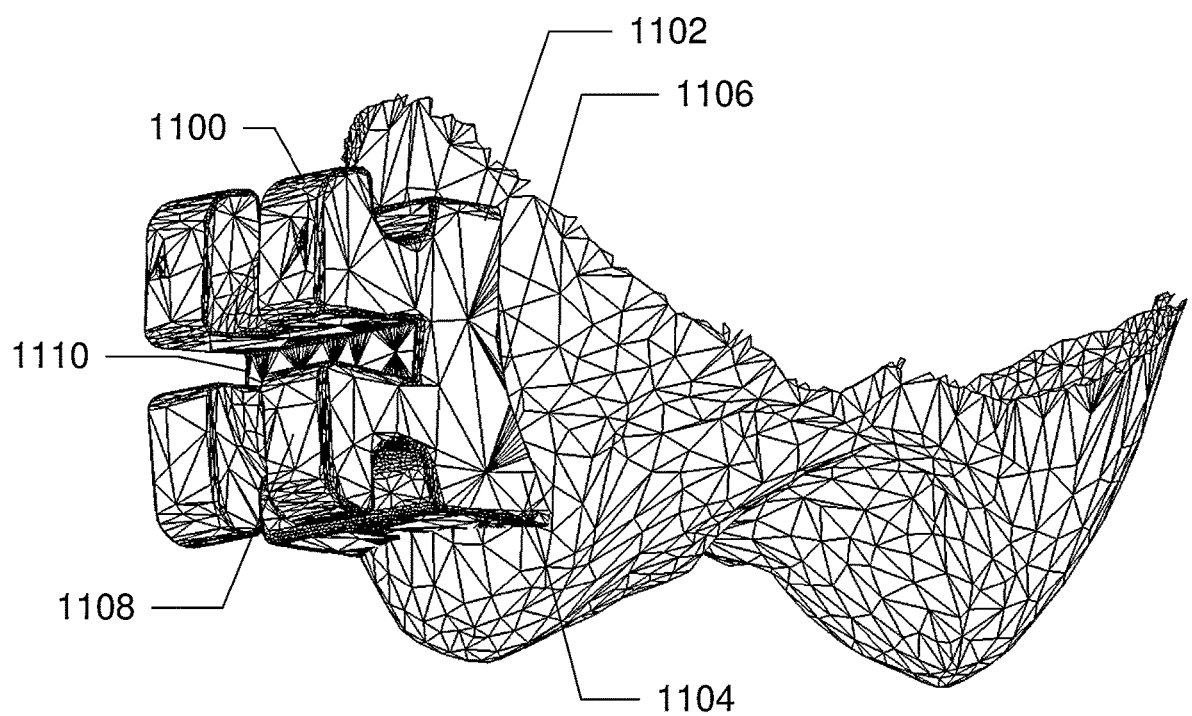
FIG. 11 is an exemplary illustration of an embodiment of an orthodontic bracket.

An example of an orthodontic bracket 1100 bonded to a tooth 1102 is shown in FIG. 11. This example depicts a bracket 1100 having a base surface 1102 that is contoured 1104 to the shape of tooth 1102, such as along a bracket/tooth interface 1106. The contouring 1104 may be configured to match the desired position of bracket 1100 on the tooth. Any changes in positioning of the bracket may require changes in contouring 1104. Base 1102 may be contoured to the tooth while the bracket face 1108 and slot 1110 may be aligned to a pre-prescribed location that includes variables typically accounted for in an orthodontic bracket prescription, including, for example 1) in/out and offset, 2) tip and 3) torque. For example, an in/out position and offset may involve bracket thickness and offset relative to a tooth along bracket/tooth interface 1106. A tip parameter may involve an angulation of slot 1110 along a mesio-distal direction. A torque parameter may involve an inclination of slot 1110 and/or base 1102 relative to a tooth surface so that torque may be applied by an archwire.

Figure 12:
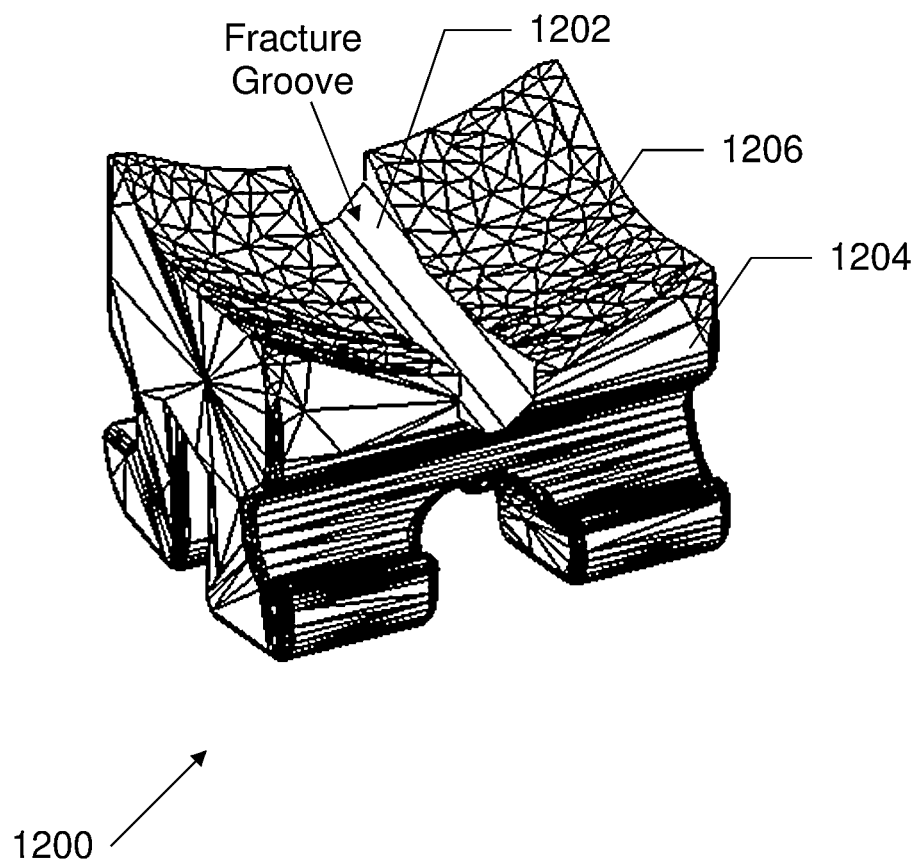
FIG. 12 is an exemplary illustration of an embodiment of an orthodontic bracket.

An example of an orthodontic bracket 1200 is shown in FIG. 12. In this example, a fracture groove 1202 may be manufactured within the middle vertical third of ceramic bracket 1200, as viewed from the base 1204 of bracket 1200. Contoured portion 1206 of base 1204 is also shown.

Figure 13:
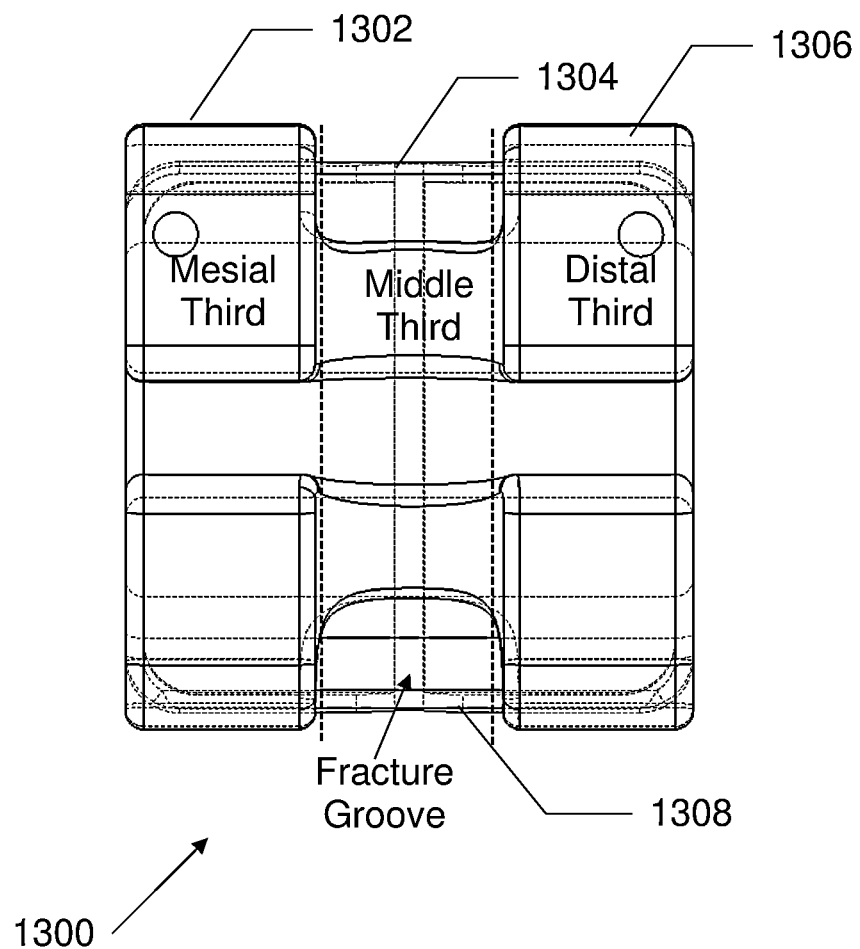
FIG. 13 is an exemplary illustration of an embodiment of an orthodontic bracket.

An example of an orthodontic bracket 1300 is shown in FIG. 13, as viewed from the base of bracket 1300. In this example, the mesial third 1302, the middle third 1304, and the distal third 1306, of bracket 1300, are indicated. A fracture groove 1308 may be manufactured within the middle vertical third 1304 on the tooth-contacting side of the ceramic bracket 1300.

Figure 14:
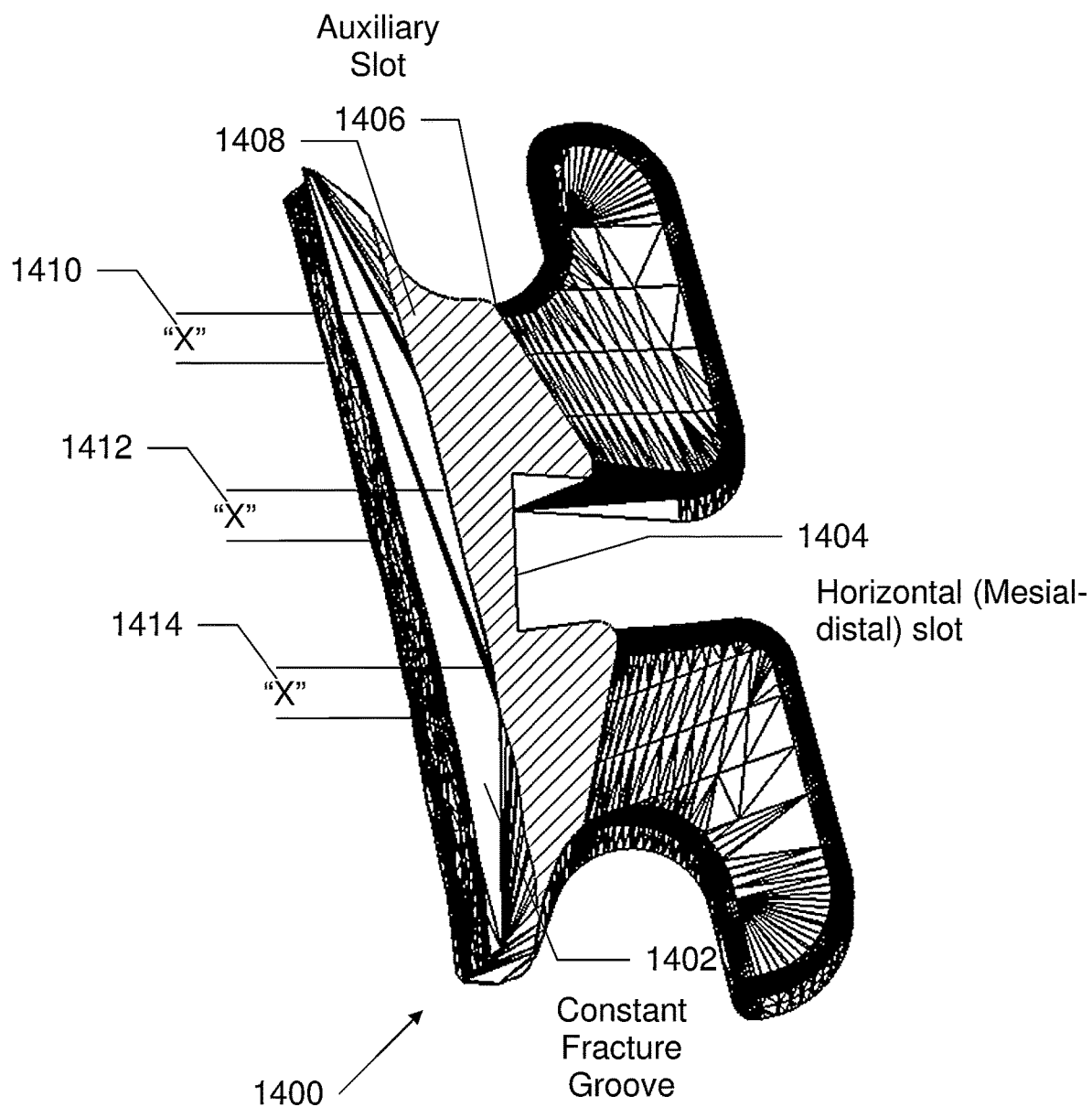
FIG. 14 is an exemplary illustration of an embodiment of an orthodontic bracket.

An example of an orthodontic bracket 1400 is shown in FIG. 14, in a cross-sectional view. In the example shown in FIG. 14, a fracture groove 1402, horizontal (mesial-distal) slot 1404, and auxiliary slot 1406 are shown. Fracture groove 1402 may include a weakened area including a tooth curved depression (groove) in the bracket base 1408 running vertically (in the occlusal-gingival direction) within the middle third of bracket 1400. Fracture groove 1402 may match the contour of the tooth for that portion of the bracket positioning. Fracture groove 1402 may align with the vertical midline and/or deepest portion of auxiliary slot 1406. The bracket area between these features may form the weakened area of bracket 1400.

Finite-element analysis has revealed that mesial-distal forces on the side of the tie-wings results in a concentration of forces in the middle third of the bracket base. In embodiments, fracture groove 1402 may be defined as an area of removed material from where such forces would have been most concentrated. The addition of fracture groove 1402 lowers the forces required to predictably create a bracket fracture down the middle vertical third of the bracket, which aids in debonding the ceramic bracket from the tooth. The weakened area and the fracture force can be optimized by adjusting the dimensions of the groove and/or the auxiliary slot.

In embodiments, fracture groove 1402 may be constant in depth from the tooth surface, as shown in FIG. 14. In embodiments, constant depth fracture groove 1402 may be a nominal or predetermined depth for some or all brackets for a patient. For example, groove depths 1410, 1412, and 1414 may all be the same predetermined depth "X". Such a nominal or predetermined depth may be in a range of, for example, 0.10 mm to 1.2 mm, inclusive. In embodiments, constant depth fracture groove 1402 may be a depth that is different for some or for each bracket. For example, a distance from the tooth surface to the deepest part of fracture groove 1402 may differ for different brackets.

Figure 15:
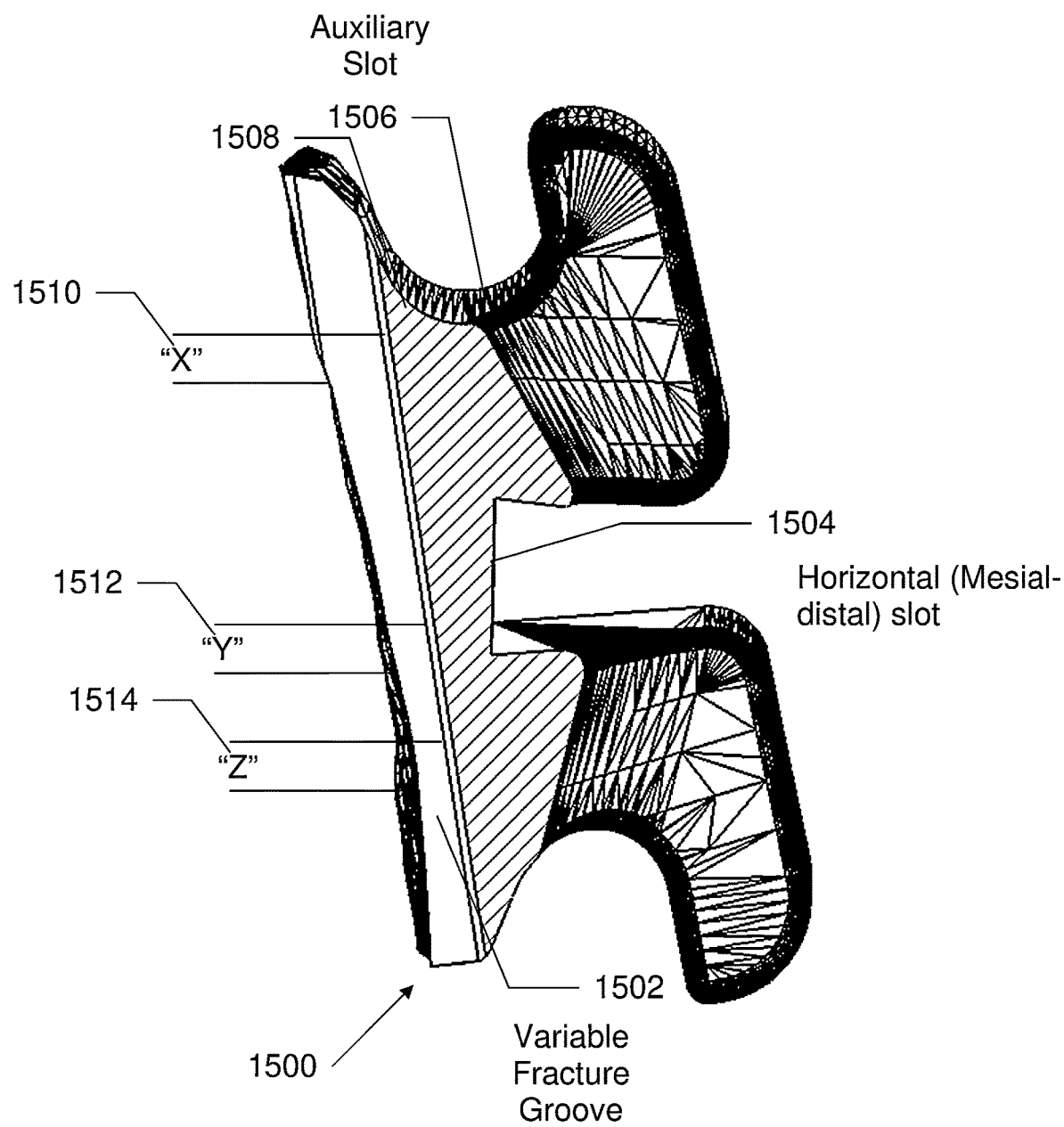
FIG. 15 is an exemplary illustration of an embodiment of an orthodontic bracket.

An example of an orthodontic bracket 1500 is shown in FIG. 15, in a cross-sectional view. In embodiments, fracture groove 1502 may be variable in depth from the tooth surface, as shown in FIG. 15. In embodiments in which fracture groove 1502 is variable, the variance may have a range of 1-50%, inclusive, of the distance from the tooth surface to the deepest part of fracture groove. For example, groove depth 1510 may be depth "X", groove depth 1512 may be depth "Y", and groove depth 1514 may be depth "Z". In embodiments, variable depth fracture groove 1502 may have a nominal or predetermined maximum depth for some or all brackets for a patient. Such as nominal or predetermined maximum depth may be in a range of, for example, 0.10 mm to 1.2 mm, inclusive. In embodiments, constant depth fracture groove 1502 may have a maximum depth that is different for some or for each bracket. For example, a distance from the tooth surface to the deepest part of fracture groove 1502 may differ for different brackets.

Figure 16:
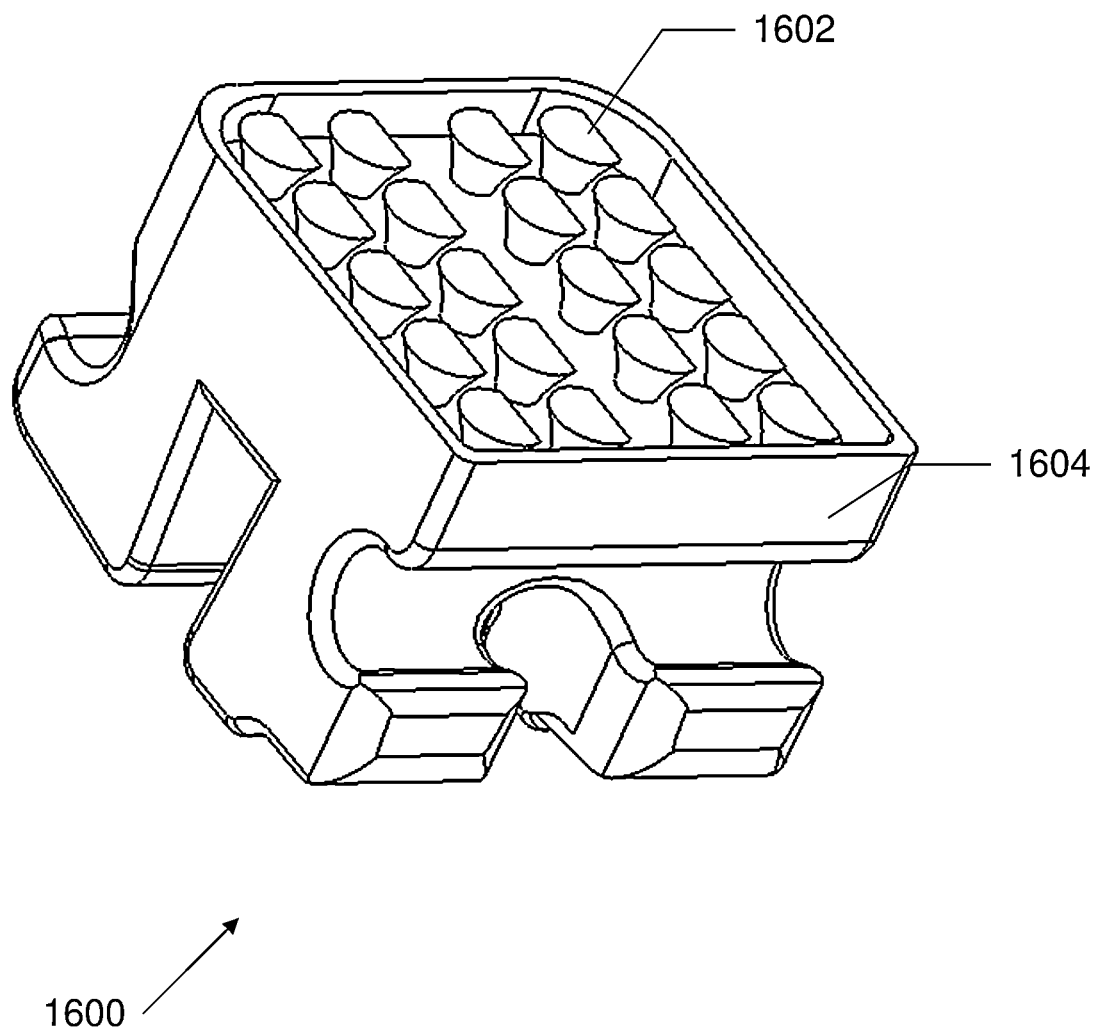
FIG. 16 is an exemplary illustration of an embodiment of an orthodontic bracket.
Figure 17:
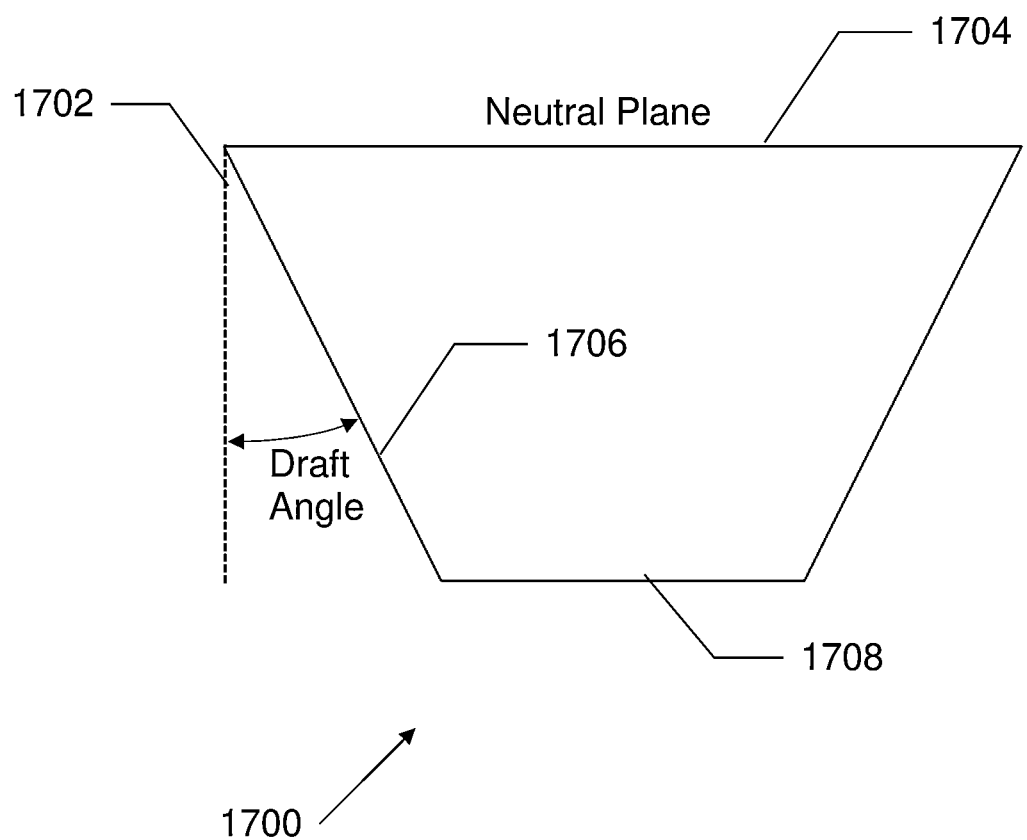
FIG. 17 is an exemplary illustration of an embodiment of a retentive structure.

An example of an orthodontic bracket 1600 is shown in FIG. 16. In this example, plurality of retentive structures 1602 are shown included in base 1604 of bracket 1600. An example of a retentive structure 1700 is shown in FIG. 17, in cross-section. In embodiments, retentive structure 1700 may be of any shape which is a three-dimensional figure with a positive draft angle greater than 0°. Draft angle 1702 may be an angle between a perpendicular to neutral plane 1704, which may be oriented toward a tooth structure or surface, and a sidewall 1706 of retentive structure 1700. In embodiments, in cross-section, retentive structure 1700 may be generally trapezoidal, with a neutral plane 1704, which may be a plane oriented toward a tooth structure or surface, being wider than a base plane 1708, which may be a plane on a side of the retentive structure 1700 oriented toward a bracket body. Neutral plane 1704 may be flat or may be contoured to the shape of the tooth surface to which it is meant to be bonded. In embodiments in which a neutral plane 1704 of each retentive structure is flat, neutral planes 1704 of all retentive structures may be parallel to base plane 1708, or a neutral plane 1704 of some or all retentive structures may not be parallel to base plane 1708, such that the overall pattern of retentive structures may be generally contoured to the tooth surface. Further the parallel or non-parallel alignment of neutral plane 1704 and base plane 1708 may affect the draft angle 1702 for each retentive structure 1700. While suitable retention may be achieved with bonding cement, a range of designed draft angles 1702 may be utilized to compensate for the limitations of particular three-dimensional printing processes. For example, to achieve a desired final draft angle, the design of the digital file's draft angle may need to be increased to compensate for over-polymerization, polymerization-shrinkage and any other compensations. If a zero or positive draft angle is achieved from the actual printed part (regardless of the digital file design), suitable retention should be achievable.

In the example shown in FIG. 16, retentive structures 1602 are shown as semi-lunar cones. However, in embodiments, retentive structures 1602 may be semi-lunar cones, full-circle cones, squares, rectangles, retentive lattices or meshes, or any other shape having a positive draft angle at any point meant to enhance bond strength. Such shapes having a positive draft angle may be more efficiently manufactured by three-dimensional printing rather than by injection molding or casting methods.

Figure 18:
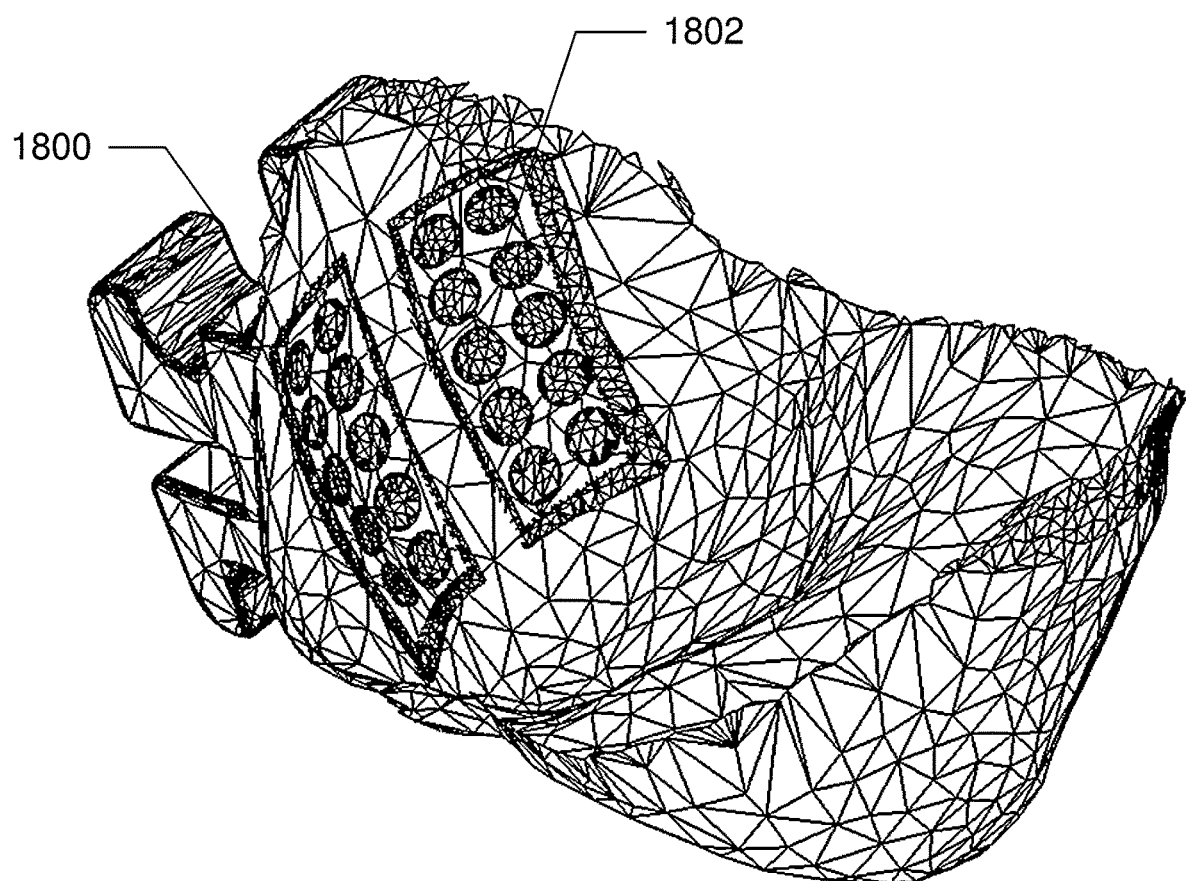
FIG. 18 is an exemplary illustration of an embodiment of an orthodontic bracket.

An example of an orthodontic bracket 1800 is shown in FIG. 18. In the example shown in FIG. 18, the retentive structures 1802 are shown contoured to the tooth surface looking from the inside of a tooth (as shown in a three-dimensional vector (e.g. .stl or additive manufacturing file format (AMF)) representation). Each structure may be contoured to fit its corresponding area of tooth surface within the prescribed bracket position.

Figure 19:
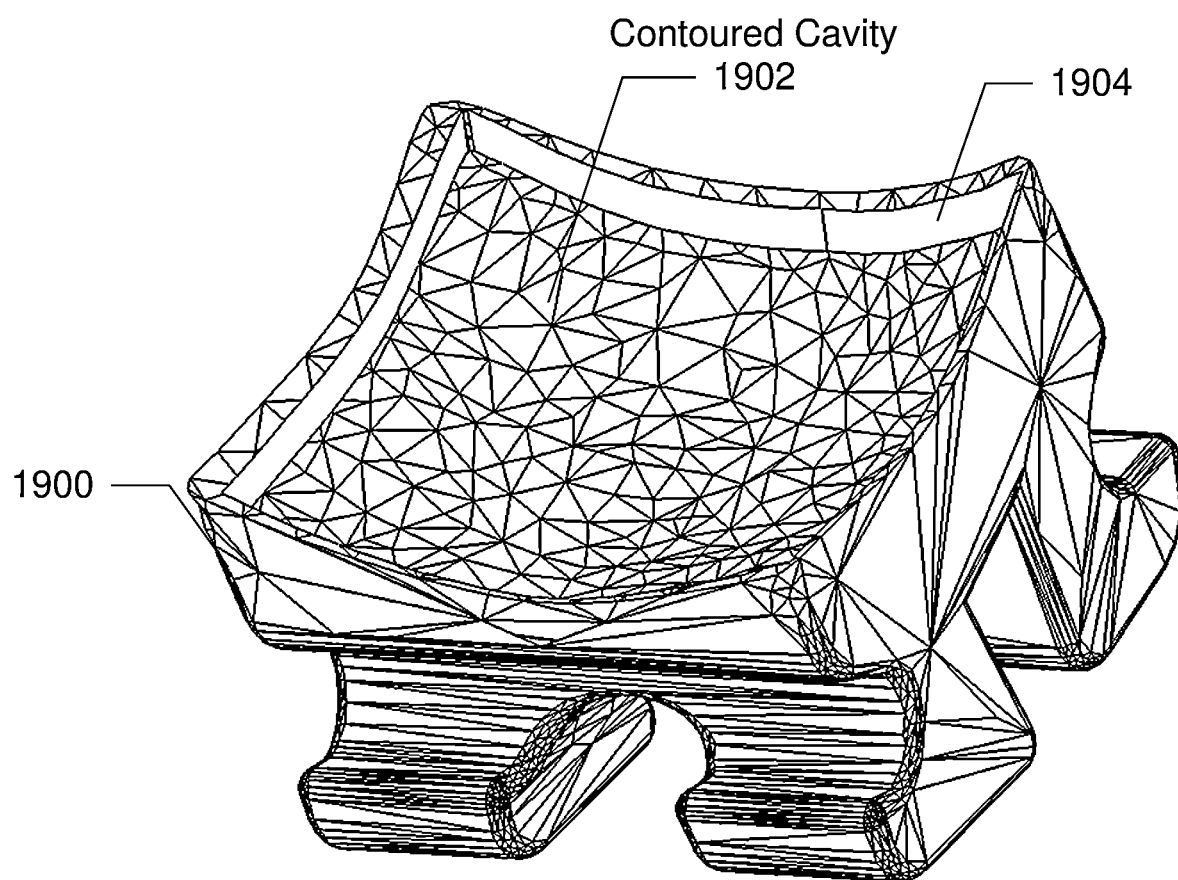
FIG. 19 is an exemplary illustration of an embodiment of an orthodontic bracket.

An example of an orthodontic bracket 1900 is shown in FIG. 19. In this example, bracket base cavity 1902 is also contoured to ensure each retentive structure maintains its dimensions and all structures have a similar depth. Further, a depth 1904 of contoured cavity 1902 may be defined.

Figure 20:
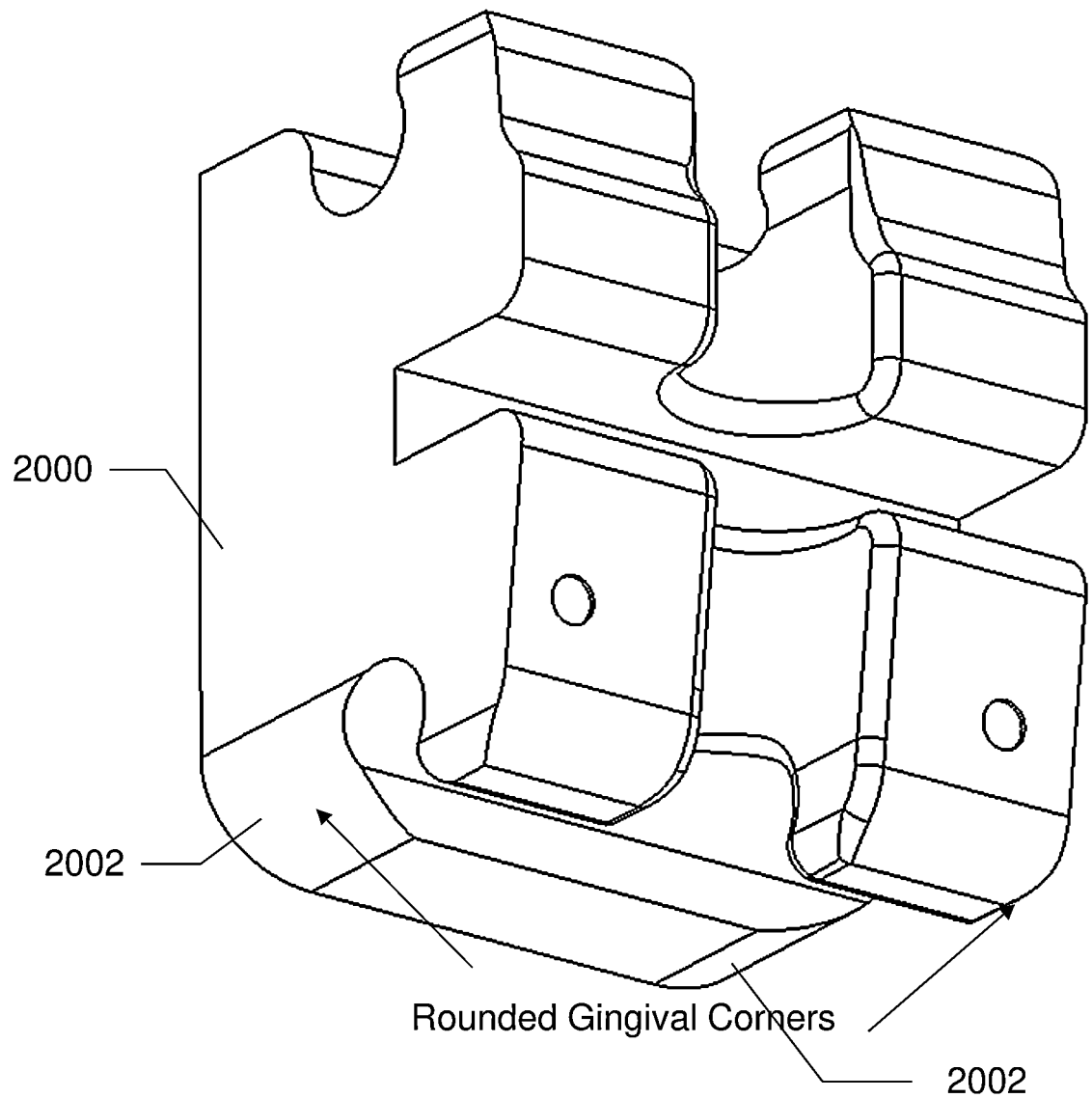
FIG. 20 is an exemplary illustration of an embodiment of an orthodontic bracket.

An example of an orthodontic bracket 2000 is shown in FIG. 20. In this example, the gingival corners 2002 of bracket 2000 may be rounded to account for the keratinized/attached gingiva, which would normally interfere with the bracket bonding surface. The roundness and radius of these corners may be changed from patient to patient, and within a case, from tooth to tooth, and is determined based on the doctor's desire to place the bracket (and slot) further gingival on the tooth than would typically be allowed by a stock bracket with a stock base. In embodiments, a radius of curvature of rounded gingival corners 2002 may be in a range of 0.05 to 2.0 mm, inclusive.

Figure 21:
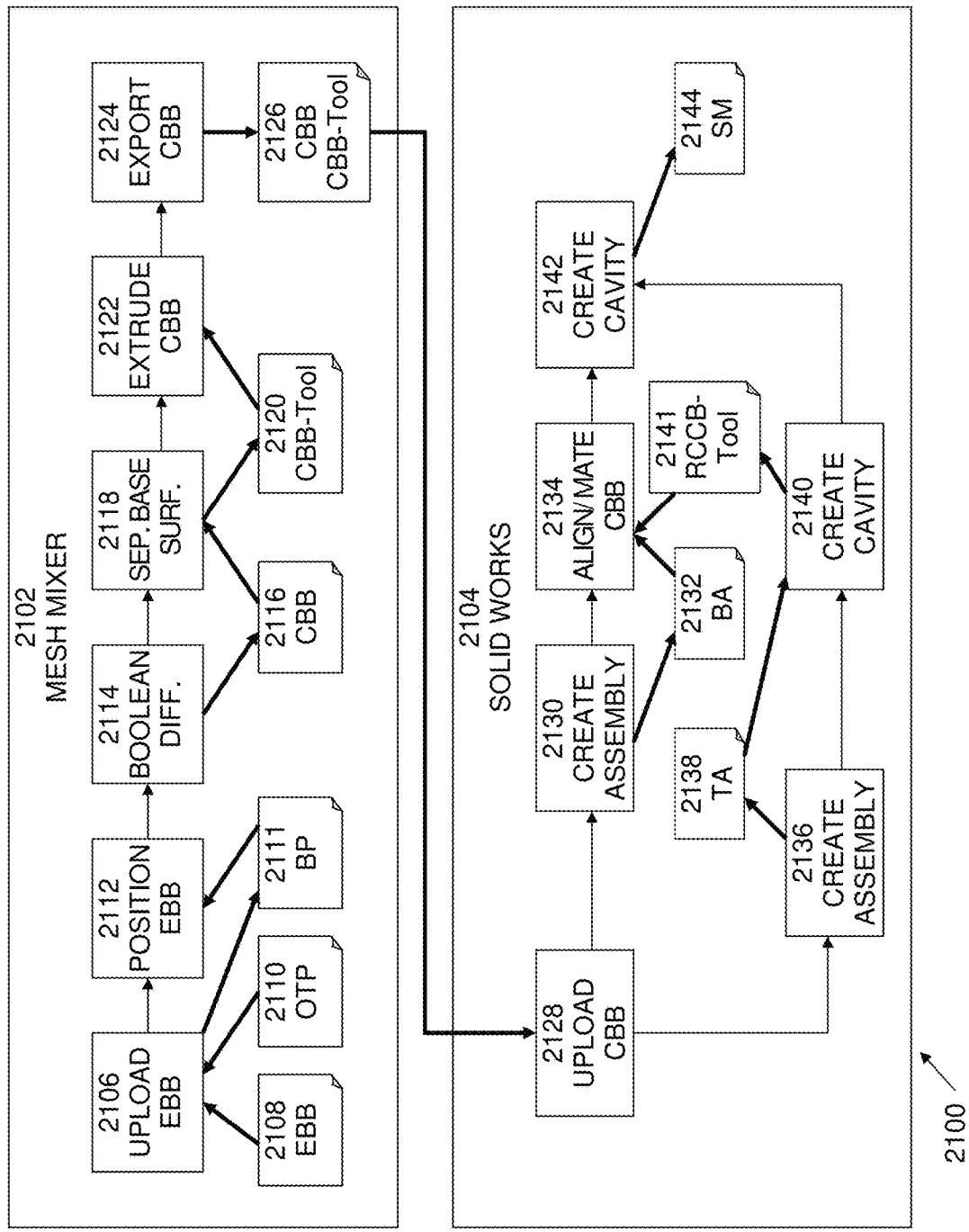
FIG. 21 is an exemplary flow diagram of an embodiment of a process of bracket design.

An example of a process 2100 of bracket design is shown in FIG. 21. In the example shown in FIG. 21, process 2100 includes the use of two major software design tools, AUTODESK MESHMIXER® 2102 and SOLIDWORKS® 2014. Although these two software packages are utilized for this example, any software tools capable of performing mesh modeling, such as triangular mesh modeling, and solid modeling, may be utilized. Process 2100 begins with 2106, in which an Extruded Base Bracket (EBB) model 2108 may be uploaded to an occluded tooth position (OTP) file 2110 to produce a Bracket Placement (BP) file 2111. EBB model 2108 may define a default or initial base design that will be modified by process 2100. OTP file 2110 may include models of the positions, shapes, and contours of the teeth to which brackets are to be attached. At 2112, initial EBB model 2108 may be positioned on a tooth included in BP file 2111. Once the bracket position is determined, at 2114, initial EBB model 2108 may be modified to incorporate the tooth surface at the determined bracket position to produce Contoured Base Bracket (CBB) model 2116. For example, a Boolean difference operation between EBB model 2108 and the tooth surface data in the OTP file 2110 may be performed to produce Contoured Bracket Base model 2116.

At 2118, the base surface of CBB 2116 may be separated to form a new part model, CBB-Tool 2120. At 2122, CBB-Tool model 2120 may be modified by extruding CBB-Tool model 2120 by a desired cavity depth, such as cavity depth 1904, shown in FIG. 19. At 2124, CBB and modified CBB-Tool 2126 may be exported from a mesh modeling tool, such as MESHMIXER® 2102 to a solid modeling tool, such as SOLIDWORKS® 2104.

At 2128, CBB and modified CBB-Tool 2126 may be uploaded and saved, for example, as .part files. At 2136, a solid model of the tool assembly (TA) 2138 may be created from modified CBB-Tool and from one or more files defining the retentive structures 1700, such as cones, etc., shown in FIG. 17. At 2140, a cavity of each retentive structure may be created within modified CBB-Tool to make a retentive CBB-Tool (RCCB-Tool) 2141. At 2130, a solid model of the bracket assembly (BA) 2132 may be created from CBB and RCBB-Tool 2141. At 2134, RCBB-Tool may be mated to CBB. At 2142, a cavity of RCBB-Tool may be created within CBB to form a finished solid model (SM) of a bracket including retentive structures 2144.

It is important to note that while aspects of the present invention may be implemented in the context of a fully functioning data processing system, those of ordinary skill in the art will appreciate that the processes of an embodiment of the present invention are capable of being distributed in the form of a computer program product including a computer readable medium of instructions. Examples of non-transitory computer readable media include storage media, examples of which include, but are not limited to, floppy disks, hard disk drives, CD-ROMs, DVD-ROMs, RAM, and, flash memory.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for use in manufacturing customized ceramic labial/lingual orthodontic brackets by additive manufacturing, the method comprising:
based on dentition data of a profile of a patient's teeth, generating a three-dimensional (3D) model of the patient's teeth;
generating a 3D model of a labial/lingual bracket structure based on the 3D model of the patient's teeth, wherein:
the labial/lingual bracket structure includes a base comprising a base surface that is contoured to a shape of a tooth of the patient,
generating the 3D model of the labial/lingual bracket structure comprises performing a Boolean difference operation between a first bracket model and at least a portion of the 3D model of the patient's teeth to define the base surface that is contoured to the shape of the tooth of the patient, and
the labial/lingual bracket structure comprises a fracture groove that extends in an occlusal-gingival direction from a topmost surface of the base of the labial/lingual bracket structure to a bottommost surface of the base of the labial/lingual bracket structure, wherein the fracture groove has a depression and the depression is curved along the occlusal-gingival direction matching a contour of a surface of the tooth of the patient; and
transmitting data indicating the 3D model of the labial/lingual bracket structure to an additive manufacturing machine for production of a bracket using the 3D model of the labial/lingual bracket structure.

2. The method of claim 1, wherein the labial/lingual bracket structure comprises:
a bracket body comprising a slot;
wherein the fracture groove is disposed in relation to the slot.

3. The method of claim 2, wherein:
the bracket body comprises a mesial tie wing pair and a distal tie wing pair; and
the bracket body comprises an arch wire slot comprising slot walls formed at least partially by the mesial tie wing pair and the distal tie wing pair.

4. The method of claim 3, wherein the slot is an auxiliary slot between the mesial tie wing pair and the distal tie wing pair.

5. The method of claim 4, wherein the fracture groove is at least partially aligned with the auxiliary slot.

6. The method of claim 4, wherein the weakened area of the labial/lingual bracket structure comprises a depression within the labial/lingual bracket structure in an occlusal-gingival direction.

7. The method of claim 1, wherein the fracture groove is located in a middle-vertical third of the 3D model of the labial/lingual bracket structure.

8. The method of claim 7, wherein the fracture groove comprises a weakened area of the labial/lingual bracket structure.

9. The method of claim 1, wherein fracture groove has a negative draft angle.

10. The method of claim 9, wherein the inorganic material comprises at least one of a ceramic or a metal.

11. The method of claim 10, wherein the ceramic is a polymer-derived ceramic, and the metal is a polymer-derived metal.

12. The method of claim 1, wherein the additive manufacturing machine is configurable to produce the bracket from an inorganic material.

13. The method of claim 1, wherein the labial/lingual bracket structure comprises a bracket pad configured to oppose a tooth surface, wherein the bracket pad comprises the fracture groove.

14. The method of claim 1, wherein the fracture groove has a depth from a surface of the tooth of the patient that is approximately constant throughout the fracture groove.

15. The method of claim 14, wherein the constant depth is in a range of approximately 0.10 millimeters to 1.2 millimeters.

16. The method of claim 1, wherein the fracture groove extends across a length of the base of the bracket structure.

17. The method of claim 1, wherein the fracture groove is formed within the base surface that is contoured to the shape of the tooth of the patient.

18. A customized ceramic labial/lingual orthodontic bracket comprising:
a base comprising a base surface that is contoured to a shape of a tooth of a patient to which the customized ceramic labial/lingual orthodontic bracket is to be bonded; and
a fracture groove that extends in an occlusal-gingival direction from a topmost surface of the base of the customized ceramic labial/lingual orthodontic bracket to a bottommost surface of the base of the customized ceramic labial/lingual orthodontic bracket, wherein the fracture groove has a depression and the depression is curved along the occlusal-gingival direction matching a contour of a surface of the tooth of the patient;

wherein the customized ceramic labial/lingual orthodontic bracket is produced by additive manufacturing using a 3D model of a labial/lingual bracket structure and a 3D model of a patient's teeth.

19. The customized ceramic labial/lingual orthodontic bracket of claim 18, further comprising:
a slot, wherein the fracture groove is disposed in relation to the slot.

20. The customized ceramic labial/lingual orthodontic bracket of claim 19, further comprising:
a mesial tie wing pair and a distal tie wing pair; and
an arch wire slot comprising slot walls formed at least partially by the mesial tie wing pair and the distal tie wing pair.

21. At least one non-transitory computer-readable storage medium encoded with a plurality of computer-executable instructions that, when executed by one or more processors, are operable to cause the one or more processors to perform a method for manufacturing a customized ceramic labial/lingual orthodontic bracket, the method comprising:

importing a 3D model of a labial/lingual bracket structure generated based on a 3D model of a patient's teeth, wherein the 3D model includes data representing a fracture groove and a base comprising a base surface that is contoured to a shape of a tooth of a patient; and using an additive manufacturing machine to form, based on the 3D model of the labial/lingual bracket structure, the customized ceramic labial/lingual orthodontic bracket with the fracture groove and the base, wherein the fracture groove extends in an occlusal-gingival direction from a topmost surface of the base of the customized ceramic labial/lingual orthodontic bracket to a bottommost surface of the base of the customized ceramic labial/lingual orthodontic bracket, and wherein the fracture groove has a depression and the depression is curved along the occlusal-gingival direction matching a contour of a surface of the tooth of the patient.

\* \* \* \* \*

UNITED STATES PATENT AND TRADEMARK OFFICE
CERTIFICATE OF CORRECTION

| | | |
|---|---|---|
| PATENT NO. | : 12,016,744 B2 | Page 1 of 1 |
| APPLICATION NO. | : 17/840549 | |
| DATED | : June 25, 2024 | |
| INVENTOR(S) | : Alfred Charles Griffin et al. | |

It is certified that error appears in the above-identified patent and that said Letters Patent is hereby corrected as shown below:

In the Claims

Claim 8, at Column 18, Line 26, "claim 7" should read --claim 1--.

Signed and Sealed this
Twenty-fifth Day of February, 2025

Coke Morgan Stewart
*Acting Director of the United States Patent and Trademark Office*